United States Patent
Gao et al.

(10) Patent No.: US 8,965,443 B2
(45) Date of Patent: *Feb. 24, 2015

(54) METHOD AND SYSTEM FOR ACCESS AND UPLINK POWER CONTROL FOR A WIRELESS SYSTEM HAVING MULTIPLE TRANSMIT POINTS

(75) Inventors: Shiwei Gao, Nepean (CA); Hua Xu, Ottawa (CA); Dongsheng Yu, Nepean (CA); Yongkang Jia, Ottawa (JP); Masoud Ebrahimi Tazeh Mahalleh, Ottawa (CA); Tarik Tabet, Kanata (CA); Youn Hyoung Heo, Suwon (KR); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 479 days.

This patent is subject to a terminal disclaimer.

(21) Appl. No.: 13/208,723

(22) Filed: Aug. 12, 2011

(65) Prior Publication Data
US 2013/0029657 A1 Jan. 31, 2013

Related U.S. Application Data

(60) Provisional application No. 61/512,684, filed on Jul. 28, 2011.

(51) Int. Cl.
*H04B 7/00* (2006.01)
*H04W 52/24* (2009.01)
(Continued)

(52) U.S. Cl.
CPC .......... *H04W 52/244* (2013.01); *H04W 74/004* (2013.01); *H04W 48/20* (2013.01);
(Continued)

(58) Field of Classification Search
None
See application file for complete search history.

(56) References Cited

U.S. PATENT DOCUMENTS

| 2001/0022779 A1* | 9/2001 | Wheatley et al. ............. 370/252 |
| 2005/0152312 A1* | 7/2005 | Marinier et al. ............. 370/332 |

(Continued)

FOREIGN PATENT DOCUMENTS

| JP | 2010034612 A | 2/2010 |
| WO | 2009076286 A1 | 6/2009 |

(Continued)

OTHER PUBLICATIONS

PCT International Search Report; Application No. PCT/US2012/040222; Jan. 3, 2013, 9 pages.

(Continued)

*Primary Examiner* — Fayyaz Alam
*Assistant Examiner* — Mohammed Rachedine
(74) *Attorney, Agent, or Firm* — Conley Rose, P.C.; J. Robert Brown, Jr.

(57) ABSTRACT

A method and system for access and uplink power control for a wireless system having multiple transmit points. In one aspect, a method at a user equipment operating in a wireless network having a plurality of transmission points including a macro evolved Node B ('eNB') and at least one low power node ('LPN') having transmit power lower than that of the macro eNB, the method finding, at the user equipment, at least one reference transmission point, the finding utilizing at least one of a calculation at the user equipment and a message from a network element; and performing, by the user equipment, uplink power control based on the at least one reference transmission.

22 Claims, 13 Drawing Sheets

(51) Int. Cl.
*H04W 74/00* (2009.01)
*H04W 48/20* (2009.01)
*H04W 52/14* (2009.01)
*H04W 84/04* (2009.01)
*H04W 52/50* (2009.01)

(52) U.S. Cl.
CPC .......... *H04W 52/146* (2013.01); *H04W 84/045* (2013.01); *H04W 52/242* (2013.01); *H04W 52/50* (2013.01); *Y02B 60/50* (2013.01)
USPC .......... 455/522; 455/524; 455/500; 455/13.4; 370/252

(56) References Cited

U.S. PATENT DOCUMENTS

| | | |
|---|---|---|
| 2009/0176525 A1 | 7/2009 | Wang et al. |
| 2009/0197631 A1 | 8/2009 | Palanki et al. |
| 2010/0035647 A1 | 2/2010 | Gholmieh et al. |
| 2010/0039948 A1 | 2/2010 | Agrawal et al. |
| 2010/0067443 A1 | 3/2010 | Luo et al. |
| 2010/0067470 A1 | 3/2010 | Damnjanovic et al. |
| 2010/0254292 A1 | 10/2010 | Kim et al. |
| 2011/0117948 A1 | 5/2011 | Ishii et al. |
| 2012/0213109 A1 | 8/2012 | Xu et al. |
| 2012/0322494 A1 | 12/2012 | Zhou et al. |
| 2013/0028109 A1 | 1/2013 | Jongren et al. |
| 2013/0272158 A1* | 10/2013 | Park et al. .................... 370/252 |

FOREIGN PATENT DOCUMENTS

| | | |
|---|---|---|
| WO | 2010030935 A2 | 3/2010 |
| WO | 2010107358 A1 | 9/2010 |

OTHER PUBLICATIONS

Gao, Shiwei, et al.; U.S. Appl. No. 13/208,659; filed Aug. 12, 2011; Title: Method and System for Access and Uplink Power Control for a Wireless System Having Multiple Transmit Points.
Office Action dated Mar. 13, 2013; U.S. Appl. No. 13/208,659 filed Aug. 12, 2011; 15 pages.
Final Office Action dated Aug. 13, 2013; U.S. Appl. No. 13/208,659 filed Aug. 12, 2011; 15 pages.
Advisory Action dated Oct. 21, 2013; U.S. Appl. No. 13/208,659 filed Aug. 12, 2011; 3 pages.
PCT International Search Report; Application No. PCT/US2012/040212; Dec. 26, 2012; 3 pages.
PCT Written Opinion of the International Searching Authority; Application No. PCT/US2012/040212; Dec. 26, 2012; 6 pages.
Ericsson, "Aspects on Distributed RRUs with Shared Cell-ID for Heterogeneous Deployments", R1-110649, 3GPP TSG-RAN WG1 #64, Feb. 2011.
NTT Docomo, R1-110867, "CoMP with Lower Tx Power RRH in Heterogeneous Network", 3GPP TSG-RAN WG1 #64, Feb. 2011.
Office Action dated Nov. 5, 2014; U.S. Appl. No. 13/208.659, filed Aug. 12, 2011; 18 pages.
European Extended Search Report; Application No. 12817145.1; Nov. 12, 2014; 8 pages.

* cited by examiner

METHOD AND SYSTEM FOR ACCESS AND UPLINK POWER CONTROL FOR A WIRELESS SYSTEM HAVING MULTIPLE TRANSMIT POINTS

CROSS REFERENCE TO RELATED APPLICATIONS

The present disclosure claims priority from U.S. provisional application no. 61/512,684, filed Jul. 28, 2011, the entire contents of which are incorporated herein by reference. The present disclosure is further related to a concurrently filed U.S. patent application Ser. No. 13/208,659 filed Aug. 12, 2011, the entire contents of which are incorporated herein by reference.

FIELD OF THE DISCLOSURE

The present disclosure relates to heterogeneous networks and in particular relates to heterogeneous networks having remote radio heads or remote radio units.

BACKGROUND

In the 3$^{rd}$ Generation Partnership Project (3GPP) Long Term Evolution-Advanced (LTE-A) working groups, heterogeneous networks having a macro evolved Node B (eNB) along with one or more remote radio heads (RRH) or remote radio units (RRU) are being considered. Heterogeneous networks utilizing a diverse set of eNBs with different transmit powers can be deployed to improve coverage and spectral efficiency in cellular communication systems.

In one embodiment, a heterogeneous network with macro eNB and multiple RRHs can use a shared cell identifier (ID) to support both legacy user equipments (UEs) and advanced UEs with coordinated multi point (CoMP) capability. Specifically, in 3GPP LTE-A, CoMP transmission schemes have been proposed to improve spectral efficiency though coordination among multiple transmission points.

However, the design of a heterogeneous network with shared cell identifiers needs to redesign various Long Term Evolution capabilities, including the random access channel (RACH) process, transmission point association, and uplink power control.

BRIEF DESCRIPTION OF THE DRAWINGS

The present disclosure will be better understood with reference to the drawings in which.

DETAILED DESCRIPTION

Figure 1:
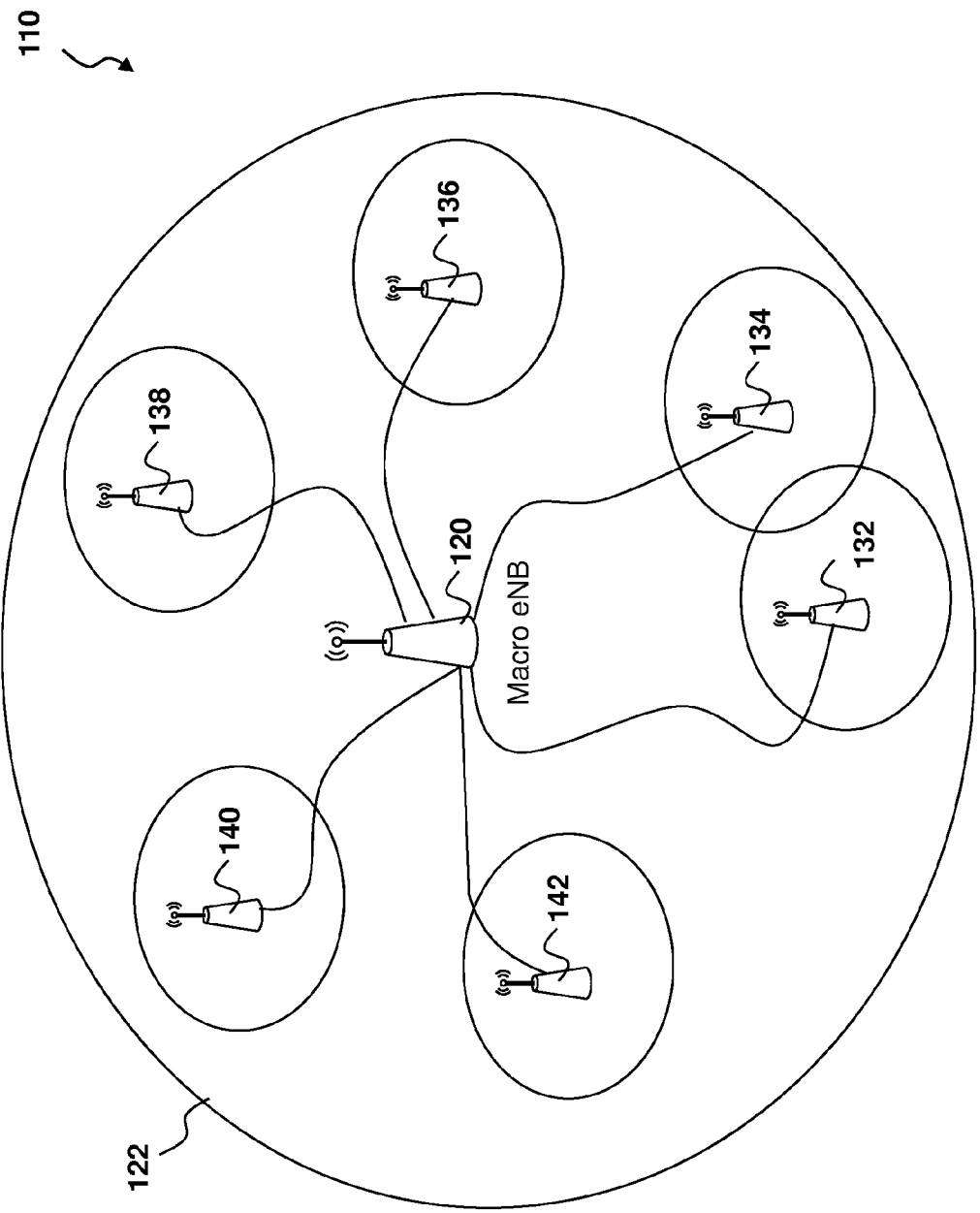
FIG. 1 is an architectural diagram of a conventional heterogeneous network.

The present disclosure provides a method at a user equipment operating in a wireless network having a plurality of transmission points (TP) including a macro evolved Node B (eNB) and at least one low power node (LPN) having transmit power lower than that of the macro eNB, the method comprising detecting, by the user equipment, a transmission point having a lowest path loss to the user equipment; and transmitting, by the user equipment, on a physical random access channel (PRACH) directed to the transmission points having the lowest path losses.

The present disclosure further provides a user equipment operating in a wireless network having a plurality of transmission points including a macro evolved Node B (eNB) and at least one low power node (LPN) having transmit power lower than that of the macro eNB, the user equipment comprising: a processor; and a communications subsystem, wherein the processor and communications subsystem cooperate to: detect a transmission point having a lowest path loss to the user equipment; and transmit on a physical random access channel (PRACH) directed to the transmission points having the lowest path losses.

The present disclosure further provides a method at a network element operating in a wireless network, the wireless network having a plurality of transmission points including a macro evolved Node B ('eNB') and at least one low power node ('LPN') having transmit power lower than that of the macro eNB, the method comprising: receiving, at the network element, at least one a random access channel preamble sent using one of a plurality of a physical random access channel ('PRACH') configurations; and providing, from the network element, a PRACH response message dependant on the one of the plurality of PRACH.

The present disclosure further provides a network element operating in a wireless network, the wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: receive a random access channel preamble sent over one of a plurality of a physical random access channel ('PRACH') configurations; and provide a PRACH response message dependant on the one of the plurality of PRACH configurations.

The present disclosure still further provides a method at a user equipment operating in a wireless network having a plurality of transmission points including a macro evolved Node B ('eNB') and at least one low power node ('LPN') having transmit power lower than that of the macro eNB, the method comprising: finding, at the user equipment, at least one reference transmission point, the finding utilizing at least one of a calculation at the user equipment and a message from a network element; and performing, by the user equipment, uplink power control based on the at least one reference transmission.

The present disclosure further provides a user equipment operating in a heterogeneous network having a plurality of transmission points including a macro evolved Node B ('eNB') and at least one low power node ('LPN') having transmit power lower than that of the macro eNB, the user equipment comprising: a processor; and a communications subsystem, wherein the processor and communications subsystem cooperate to: find, at the user equipment, at least one reference transmission point, the finding utilizing at least one of a calculation at the user equipment and a message from a network element; and perform, by the user equipment, uplink power control based on the at least one reference transmission.

The present disclosure further provides a method at a network element operating in a wireless network, the wireless network having a plurality of transmission points including a macro evolved Node B ('eNB') and at least one low power node ('LPN') having transmit power lower than that of the macro eNB, the method comprising: determining, by the network element, a reference transmission point for a user equipment; signalling, by the network element, a reference transmission point to a user equipment; receiving, by the network element, an indication of a potential reference transmission point from a user equipment; and selecting, by the network element, a reference transmission point based on the indication.

The present disclosure further provides a network element operating in a wireless network, the wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: determine a reference transmission point for a user equipment; signal a reference transmission point to a user equipment; receive an indication of a potential reference transmission point from a user equipment; and select a reference transmission point based on the indication.

The present disclosure still further provides a method at a user equipment operating in a wireless network having a plurality of transmission points including a macro evolved Node B ('eNB') and at least one low power node ('LPN') having transmit power lower than that of the macro eNB, the method comprising: receiving, by the user equipment, transmissions from a plurality of transmission points, each transmission having a transmission point specific signal ('TSS') and performing, by the user equipment, power calculations based on the transmissions.

The present disclosure still further provides a user equipment operating in a wireless network having a plurality of transmission points including a macro evolved Node B ('eNB') and at least one low power node ('LPN') having transmit power lower than that of the macro eNB, the user equipment comprising: a processor; and a communications subsystem, wherein the processor and communications subsystem cooperate to: receive transmissions from a plurality of transmission points, each transmission having a transmission point specific signal ('TSS') and perform power calculations based on the transmissions.

The present disclosure further provides a method at a network element operating in a wireless network, the wireless network having a plurality of transmission points including a macro evolved Node B ('eNB') and at least one low power node, the method comprising: sending a signal from the transmission point, including a transmission point specific signal ('TSS') to distinguish between the plurality of transmission points.

The present disclosure further provides a network element operating in a wireless network, the wireless network having a plurality of transmission points including a macro evolved Node B ('eNB') and at least one low power node, the method comprising: sending a signal from the network element, including a transmission point specific signal ('TSS') to distinguish between the plurality of transmission points.

The present disclosure further provides a method at a user equipment operating in a wireless network having a plurality of transmission points including a macro evolved Node B ('eNB') and at least one low power node ('LPN') having transmit power lower than that of the macro eNB, the method comprising: measuring, by the user equipment, channel state information from a plurality of transmission points; processing, by the user equipment, the channel state information to derive a subset of transmission points from the plurality of transmission points; providing, by the user equipment, a report to a transmission point for the subset of transmission points; and receiving a selection for at least a set of transmission points for at least one of an uplink reception and downlink transmission for the user equipment.

The present disclosure further provides a user equipment operating in a wireless network having a plurality of transmission points including a macro evolved Node B ('eNB') and at least one low power node ('LPN') having transmit power lower than that of the macro eNB, the user equipment comprising: a processor; and a communications subsystem, wherein the processor and communications subsystem cooperate to: measure channel state information from a plurality of transmission points; process the channel state information to derive a subset of transmission points from the plurality of transmission points; provide by the user equipment, a report to a transmission point for the subset of transmission points; and receive a selection for at least a set of transmission points for at least one of an uplink reception and downlink transmission for the user equipment.

The present disclosure further provides a method at a network element operating in a wireless network having a plurality of transmission points including a macro evolved Node B ('eNB') and at least one low power node ('LPN') having transmit power lower than that of the macro eNB, the method comprising: finding, at the network element, received signal strength from a user equipment at each transmission point; selecting at least one transmission point to receive the uplink signal from the user equipment.

The present disclosure further provides a network element operating in a wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: find received signal strength from a user equipment at each transmission point; and select at least one transmission point to receive the uplink signal from the user equipment.

The present disclosure further provides a method at a network element operating in a wireless network having a plurality of transmission points including a macro evolved Node B ('eNB') and at least one low power node ('LPN') having transmit power lower than that of the macro eNB, the method comprising: finding, at the network element, at least one downlink transmission point for a user equipment, the finding of the downlink transmission point using an estimated signal strength and transmit power for each transmission point, wherein the received signal strength is estimated at the user equipment from each transmission point.

The present disclosure further provides a network element operating in a wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: find, at the network element, at least one downlink transmission point for a user equipment, the finding of the downlink transmission point using an estimated signal strength and transmit power for each transmission point, wherein the received signal strength is estimated at the user equipment from each transmission point.

Reference is now made to FIG. 1. FIG. 1 shows a heterogeneous network 110 comprising a macro eNB 120 along with a plurality of low power nodes (LPNs). In FIG. 1, LPNs 132, 134, 136, 138, 140, and 142 are shown.

The macro eNB 120 has a cell coverage area shown by circle 122. The macro eNB can transmit at a high power level. For example, the macro-eNB transmit power can be in the range of about 40 dBm to about 49 dBm, while the LPNs transmit power can be in the range of about 30 dBm to about 37 dBm.

LPNs 132 to 142 could be an eNB with a lower transmit power, such as a pico eNB or a femto eNB, or could be a remote radio head (RRH) or a remote radio unit (RRU). The present disclosure is not limited to any particular LPN.

An LPN 132 to 142 can be deployed along the edge of a cell coverage area 122 or hot spots where a large number of UEs may be present in a number of small areas of cellular coverage area 122 to increase throughput performance for a UE located near these areas.

In one embodiment, LPNs 132 to 142 could each have their cell identifiers different from one another and from the macro eNB. In a further embodiment, the LPNs could be assigned with the same cell ID as the macro eNB 120. According to the present disclosure, only embodiments in which LPNs share the cell ID with the macro eNB 120 are considered.

As used herein, a transmission point (TP) could be either the macro eNB or an LPN.

Coordinated multi-point (CoMP) is a transmission or reception scheme considered within 3GPP as a tool to improve cell coverage, cell edge throughput and system efficiency. Basically, when a UE is close to multiple TPs, signals may be received from multiple TPs. If the transmissions are coordinated, downlink performance at the UE can be improved over just the use of a single TP by reducing and/or avoiding interference from other TPs. Similarly, for uplink performance, the UE may transmit to a closest TP as opposed to having to transmit to a macro eNB, which may be some distance away. This again improves the uplink performance and could also save a UE's battery power.

Two forms of CoMP schemes exist for 3GPP. These include coordinated scheduling and/or beam-forming (CS/CB) and joint processing (JP) CoMP.

In the case of CS or CB, the goal is to avoid or minimize inter-cell interference through either coordinated scheduling or precoding among adjacent TPs. For this purpose, a UE needs to measure the downlink (DL) channel state information (CSI) for a set of TPs configured for DL CSI measurement, referred to as CoMP measurement set or M-set. The UE also needs to feedback the CSI for a set of TPs configured for CSI feedback, referred to as CoMP feedback set or F-set.

The CoMP feedback set could be the same or a subset of the CoMP measurement set. The CSI feedbacks, which include the channel state information such as channel quality indicator (CQI), precoding matrix indicator (PMI) and rank indicator (RI), could be sent to only the serving TP and communicated amongst the TPs in a CoMP transmission set, or T-set, through inter-TP back haul communications links.

In the case of JP, data to a single UE is simultaneously transmitted from multiple TPs to improve the received signal quality at the UE. In this case, data intended for a particular UE is shared among different TPs and is jointly processed at these TPs. The UE could feedback the CSI for each TP separately or jointly, which may include PMI, CQI and RI. The eNB could apply precoding to the data and send this back to the UE simultaneously based on the feedback from the UE. As a result of the joint processing, the received signals at the intended UE could be coherently combined together. To enable JP, a UE needs to measure and feedback downlink CSI for candidate TPs.

With regard to an initial access procedure at the UE, in 3GPP LTE the initial access procedure includes two steps, which are cell search and random access.

A cell search procedure is used by UEs to acquire time and frequency synchronization within a cell and to detect the cell ID. The cell search is based on the primary synchronization signal (PSS) and the secondary synchronization signal (SSS).

After the completion of the cell search having acquired other system information of the cell, the UE may try to access the system by initiating a random access procedure.

Figure 2:
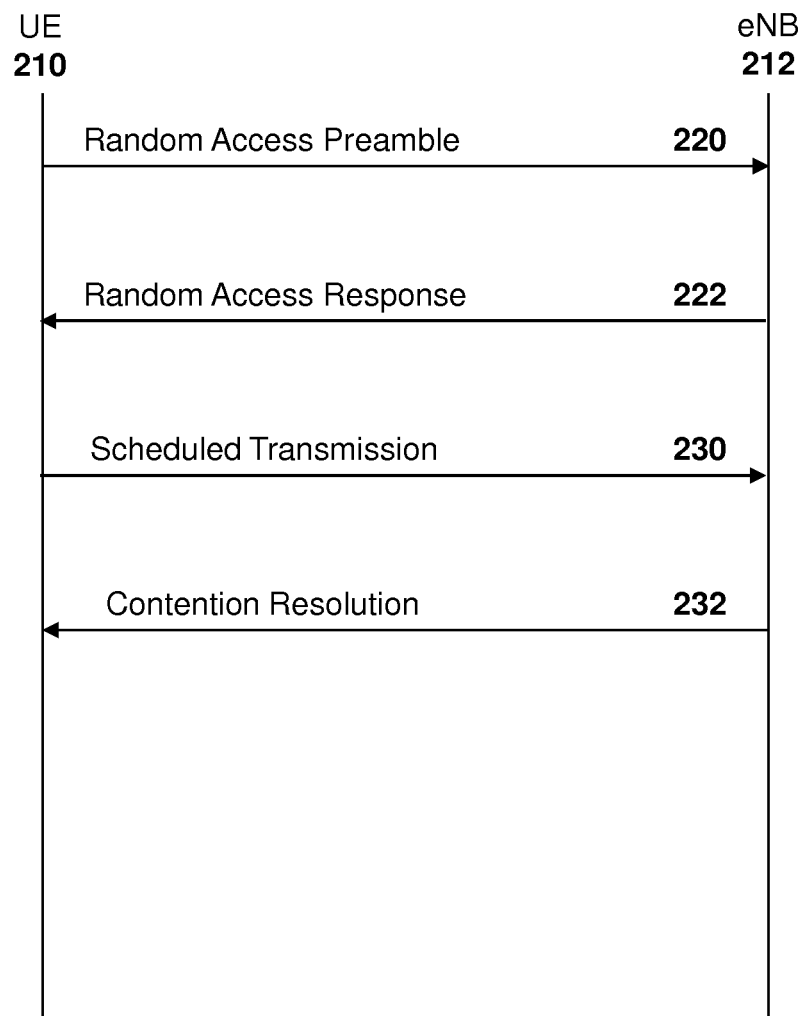
FIG. 2 is a signaling diagram showing a RACH procedure.

Reference is now made to FIG. 2, which shows a procedure for contention based random access procedure. In particular, in FIG. 2 a UE 210 communicates with an eNB 212. At the outset, UE 210 sends a random access preamble, shown by arrow 220 to eNB 212. The random access preamble is based on system information received from the eNB in broadcast messages or handover command and the UE randomly selects a random access preamble from a set of preambles configured in the cell and transmits on the configured Physical Random Access Channel (PRACH) time and frequency resource.

If a random access attempt is detected, such as the receipt of the random access preamble 220, the eNB 212 transmits a downlink grant in a Physical Downlink Control Channel (PDCCH) with the cycle redundancy check (CRC) scrambled with a random access-radio network temporary identifier (RA-RNTI) and transmits the corresponding random access response (RAR) message, as shown by arrow 222, on a physical downlink shared channel (PDSCH). The RA-RNTI is determined by the time-frequency resource over which the PRACH is received and is also known to the UE 210. The RAR contains information such as the detected preamble identifier (RAPID), i.e. the preamble index within the set of configured preambles configured in the cell, the timing advanced command for uplink transmissions from the UE 210, a temporary UE identity (i.e. temporary cell-RNTI (C-RNTI)), and an initial uplink resource grant including power control command.

When receiving the RAR message 222 from the eNB 212 with a matching RA-RNTI and preamble identifier (RAPID), the UE 210 assumes the PRACH has been received by the eNB 212 and thus transmits an uplink message, shown by arrow 230. The uplink message includes a UE specific command control channel (CCCH) service data unit (SDU) on the scheduled physical uplink shared channel (PUSCH) after applying timing and power correction. The cyclic Redundancy Check (CRC) code of the message is scrambled by the temporary C-RNTI.

The eNB then performs contention resolution, as shown by arrow 232, when multiple UEs use the same preamble and same uplink time frequency resources. The eNB responds to the UE with a UE Contention Resolution Identity containing the CCCH SDU that was attached to the message transmitted at arrow 230. The RACH process is completed after the UE receives the message 232 that matches the previously transmitted CCCH SDU. The temporary C-RNTI assigned to the UE then becomes C-RNTI, which is used for subsequent data transmissions between the UE 210 and the eNB 212.

Given the above, in order to allow the deployment of a heterogeneous network with LPNs having the same cell ID as the macro eNB various issues need to be addressed.

A first issue involves backwards compatibility considerations. Specifically, UEs based on different LTE releases are expected to coexist in a cell. The 3GPP standards define the functionality for a UE in accordance with a LTE release number. Various UEs could be implemented based on Release 8, Release 9 or Release 10 functionality, for example. These UEs may be considered to be legacy UEs for the present disclosure, but may still need to be supported by a network, and their performance should be improved or at least maintained.

As LTE evolves to new releases, different types of downlink reference signals (RS) are introduced for different purposes. One reason to introduce a new RS is to optimize the performance further.

For example, reference is now made to Table 1 below. In Table 1, a cell specific reference signal (CRS) is used in Release 8 or 9 UEs for the purpose of demodulation, channel state information (CSI) measurement and reference signal received power (RSRP) measurement.

In Release 10 specifications, the CSI-RS is introduced and used solely for measuring CSI. The Release 10 changes were made since it was envisioned by 3GPP work groups that the CSI feedback frequency should be sparse in time while supporting up to eight layers. While the Release 8 CRS cannot support this feature, the Release 8 CRS needs to be maintained for backwards compatibility considerations.

In Release 10, PDSCH demodulation for advanced UEs relies on newly introduced UE specific reference signals, also referred here as demodulation reference signals (DM-RS), which is transmitted together with the PDSCH. However, PDCCH demodulation still relies on CRS.

For certain transmission modes (TM), to achieve backward compatibility, both the Release 8 CRS and the Release 10 CSI-CRS should be supported in future LTE releases.

TABLE 1

| | RS usage | | |
|---|---|---|---|
| | CRS | CSI-RS | DM-RS |
| Release 8/9 | Demodulation for PDSCH (except TM7 and TM8) and PDCCH CSI measurement RSRP measurement | N/A | Rel-8 TM7 Rel-9 TM8 Demodulation for PDSCH |
| Release 10 | Retain Release 8/9 usage for release 8/9 UEs Demodulation for PDCCH for Rel-10 UE RSRP measurement | CSI measurement | Rel-10 TM9 Demodulation for PDSCH |

In accordance with the present disclosure, since the same cell identifier is assigned to both the LPNs and macro eNB in the cell, only one set of cell specific signals or channels such as CRS, PSS, SSS, physical broadcast channel (PBCH), among others, are transmitted in a cell. One issue then is how to transmit the signals, since a maximum of four antenna ports are defined in Release 8 for signals or channels.

In accordance with the embodiments below, it is assumed that all Release 8 cell specific signals or channels such as CRS, PSS, SSS and PBCH are transmitted from all TPs in a cell as shown below with regard to FIG. 3.

Figure 3:
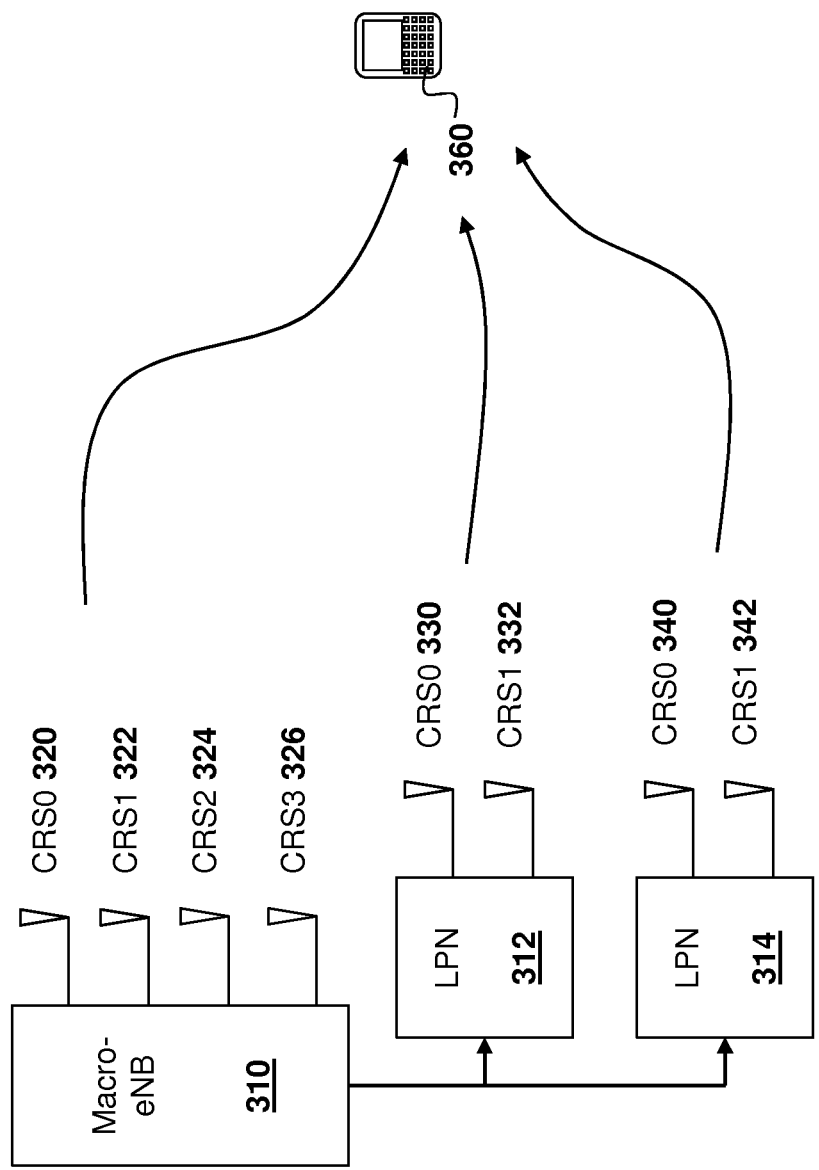
FIG. 3 is a block diagram showing antenna ports for CRS communication with a UE.

In particular, FIG. 3 shows a macro eNB 310 and two LPNs, namely LPN 312 and LPN 314.

Macro eNB 310 includes four antenna ports, shown as CRS0 320, CRS1 322, CRS2 324 and CRS3 326.

LPN 312 includes two antenna ports, shown as CRS0 330 and CRS1 332. LPN 314 includes two antenna ports, shown as CRS0 340 and CRS1 342.

Each of macro eNB, LPN 312 and LPN 314 communicate with a UE 360. The use of Release 8 cell specific signals or channels allows legacy UEs to benefit from the deployment of LPNs. However, in some embodiments described herein, the solution may be also applicable to the case where the CRS is transmitted from the macro eNB only.

A second issue with regard to the use of LPNs having the same cell ID as the macro eNB is TP association. If different cell IDs are assigned to LPNs and each LPN acts as an independent eNB, there could be a cell splitting gain as the same time-frequency resources are used in different LPNs, resulting in increased spectral efficiency and system capacity. However, interference also occurs among LPNs and the macro eNB. Interference problems may be solved by assigning the same cell ID to LPNs together with a centralized downlink scheduling for all TPs in a cell. However, it may still be desirable to achieve a cell splitting gain, at least for Release 11 UEs onwards.

One way to achieve cell splitting gain may be to transmit downlink data to a UE over only a TP close to the UE. As used herein, "close to" means that the UE receives the best downlink signal quality from the TP.

Thus, the same resources could be reused for different UEs in different TPs coverage that are geographically well separated. While transmission from the macro eNB could cause interference to UEs served by the low power TPs if the same resource is used, this can be avoided by scheduling those UEs on different resources since the centralized scheduler may be used in such a deployment.

In order to use the TP scheduling, the eNB needs to know the closest TP or TPs to a UE. The process for determining the closest TP or TPs to a UE is referred to herein as TP association. In legacy LTE systems, a UE associates to a serving TP (or eNB) through a cell search over PSS/SSS and hands over to another eNB or TP through RSRP measurements and reporting. However, such mechanism used in the legacy system cannot be used for TP association in a system which has a PSS, SSS and CRS that is common to all TPs in a cell.

A third issue for LPNs being deployed having the macro eNB sharing the same cell ID involves the random access channel (RACH). Specifically, existing LTE PRACH procedures were designed with the assumption that only a macro eNB exists in a cell. New release 11 and future systems having multiple TPs sharing the same cell ID may need a UE to determine the closest TP and sent the PRACH to this TP with a minimum required transmit power. This may allow minimization of interference in the uplink as well as spatial reuse of radio resources in different TPs. The low power signal also reduces power consumption on the device, which saves battery resources at the UE.

However, the UE may not have knowledge of TPs at the stage of sending the PRACH since the UE does not know which TPs are close to it through measuring the signal strength of the CSI-RS associated with different TPs if UEspecific CSI-RS configuration as defined in Release 10 is used. In addition, the propagation path loss, if calculated by the UE based on a composite channel from the CRS, does not provide accurate information about the closest TP. Therefore, a UE is not able to transmit an optimal uplink power for PRACH to save battery consumption and minimize interference.

The use of excess power impacts system performance and introduces extra initial access time. Further, when the UE moves away from the low power TP, for example to a macro eNB, it may not know when it should use different RACH power with different targets.

In addition, one issue is how to transmit a response to the RACH from a TP that is close to the UE. During the initial PRACH process, the eNB does not know the capability of a UE and thus the RACH response needs to be broadcast from all TPs. This increases bandwidth overhead compared to the case when different cell IDs are assigned to LPNs and thus different PRACHs are configured for different LPNs.

A fourth issue with regard to using the same cell ID for LPNs and a macro eNB is uplink power control. In Release 8, 9 and 10 systems, uplink power control is relatively straightforward as the UE measures the path loss in the downlink based on knowledge of transmit power of the eNB and the received signal power from the eNB. It then could use the estimated path loss to decide the uplink transmit power in order to achieve a target received signal level at the eNB.

In a Release 11 or future system having a heterogeneous network with TPs having the same cell ID, the received CRS signals at the UE are composite signals if the CRS is transmitted from all TPs. In addition, without a change in signaling, the UE may not know the existence of LPNs and their transmit powers and thus it may be difficult for the UE to estimate the path loss from each TP to the UE. As a result, excessive transmit power may be used for PRACH or other uplink channel transmission by the UE, causing unnecessary interference to other UEs in the same or nearby TPs and also draining the battery of the UE more quickly. Therefore, there is a need for a scheme to allow for the same cell ID for LPNs and macro eNB.

TP Specific Reference Signal

In one embodiment, in a heterogeneous network described earlier in connection with FIG. 1, a TP specific reference signal (TSS) can be introduced to each TP deployed in the cell for new Release 11 and onward UEs to identify the closest TP and to calculate corresponding path loss for uplink open loop power control. The TSS could be transmitted in the same slots as PSS/SSS or could be allocated in a completely different time and frequency from the PSS/SSS.

The TSS from different TPs could be multiplexed in time, frequency or code division domains.

If TSS is used as an identifier for an LPN, then it does not need to be transmitted from the macro eNB. The configurations of TSS for all TPs in the cell are broadcast in the downlink system messages.

In particular, the TSS may be introduced for each TP in a cell. Each TP may be assigned a unique TSS and different TPs are assigned with a different TSS. TSS can be used by a Release 11 onwards UE to identify a TP or TPs close to it for the purposes of downlink path loss calculation, for determining transmit power in the uplink and for TP specific downlink received signal strength (RSS) estimation.

The TSS configuration information for each TP could be broadcast in a cell along with other TP specific information such as TP transmission power. The TSS from different TPs could be multiplexed in either time, frequency, code division manners, or their combinations. Thus, a UE could determine surrounding TPs based on TSS detection.

Figure 4:
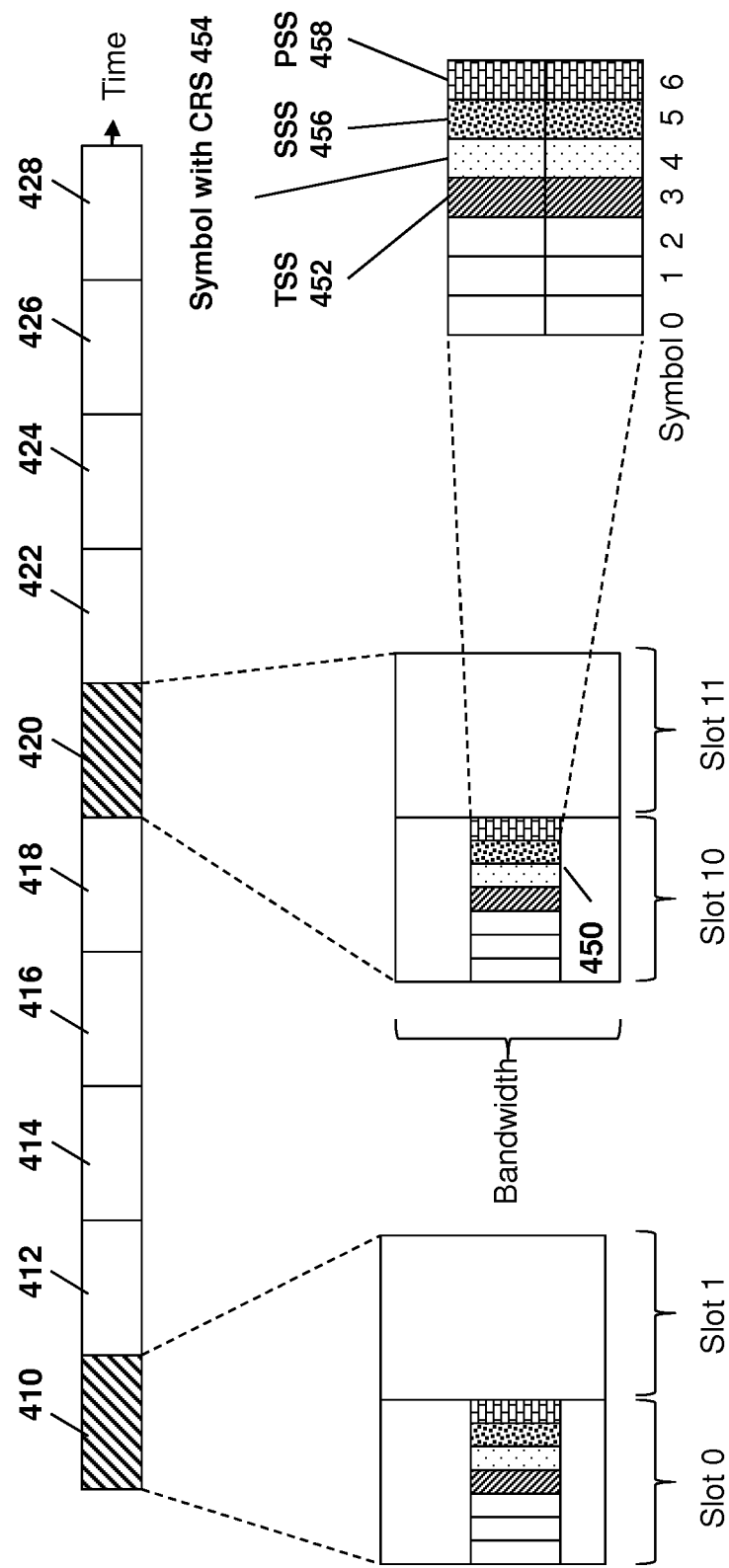
FIG. 4 is a signal diagram showing insertion of a TSS in subframes with PSS/SSS.

Reference is now made to FIG. 4, which shows an example of TSS resource allocation and in particular various sub-frames 410, 412, 414, 416, 418, 420, 422, 424, 426 and 428 are shown.

In the embodiment of FIG. 4, sub-frames 410 and 420 are used for transmission of PSS and SSS, whereas sub-frames 412, 414, 416, 418, as well as sub-frames 422, 424, 426 and 428 do not transmit the PSS and SSS.

In the embodiment of FIG. 4, the TSS is located in the third OFDM symbol of sub-frames 410 and 420 and on the same radio bearers as the PSS and SSS. Thus, for example, OFDM symbol block 450 includes the symbol with TSS 452, the symbols with CRS 454, SSS 456 and PSS 458 respectively.

In an alternative embodiment, the TSS could be allocated in completely different time and frequency resources from the PSS/SSS.

For the generation of the TSS, the TSS at a TP could be generated based on the TP identifier through a number of methods. For example, different TPs may be assigned with different cyclic shifts of a base Zadoff-Chu sequence. In another example, different Zadoff-Chu sequences may be allocated to different TPs.

A UE may be configured to report the received TSS signal strength (RSS) of the first few TPs with the strongest RSS (the maximum number of TPs that the UE could report is configured by the eNB). The RSS information may be used by the eNB to determine a CoMP set for the UE. In other words, a set of TPs configured to participate in the coordinated transmission to the UE through either JP or CS/CB CoMP may be semi-statically configured.

The RSS may also be used for inter-TP "handover" from one TP to another. As used in the present embodiment, inter-TP handover means transition from one TP to another for transmission to the UE.

In a further alternative embodiment, TP specific signaling may not be limited to TSS as described above. The TP specific signaling could be based on other signals which may be defined in LTE already, such as CSI-RS as defined in Release 10. The UE could obtain the CSI-RS configuration for each TP and use this configuration, along with the TP transmit power to derive path loss to each TP.

Based on the above, a TP specific signal could be transmitted from each TP and the TSS could be used by Release 11 and onward UEs for channel measurement and path loss estimation. Such TP specific signal could reuse CSI-RS signal as defined in Release 10 or be provided over a newly defined signal.

If the TSS is generated from a root Zadoff-Chu sequence, the TSS sequence may be generated as follows. The TSS sequence is generated from a root Zadoff-Chu sequence of length $N_{ZC}$ with root index u in accordance with:

$$z_u(n)=e^{j\pi \cdot u \cdot n(n+1)/N_{ZC}}, n=0,1,\ldots,N_{ZC}-1, \quad (1)$$

Further, in addition to the root Zadoff-Chu sequence, other types of Constant Amplitude Zero Auto-Correlation (CAZAC) sequences or M-sequences with good auto-correlation and cross correlation properties can be applied to the TSS as well.

Different TPs may be assigned with different root indices. Alternatively, different cyclic shifts of the same root sequence may be assigned to different TPs in a cell in accordance with the embodiments described below. Different TPs could also be assigned to the same sequence but then self identify themselves in the time domain. For example, different periodicity and offsets could be used which could be configured in the TSS configuration information.

With regard to TSS configuration and multiplexing, from the $u_{TH}$ root Zadoff-Chu sequence, the TSS sequence for TP k can be defined as:

$$x_k(n) = z_u((n+C_k) \bmod N_{ZC}), n=0,1,\ldots,N_{ZC}-1. \quad (2)$$

Where $\bmod N_{ZC}$ is a modular $N_{ZC}$ operation, and $C_k$ is the cyclic shift given by:

$$C_k = kN_{CS} \quad (3)$$

And where $N_{CS}$ is a delta cyclic shift. In other words, this is the difference between two cyclic shifts. One property of the TSS sequence is that TSS with different cyclic shifts are orthogonal to each other. Therefore, multiple TSSs from different TPs may be transmitted in the same time frequency resource in a sub-frame.

Both Release 11 and legacy UEs perform cell searches in traditional ways. Legacy UEs do not know about the presence of a TSS and thus a scheduler, in one embodiment, may avoid scheduling data in the TSS resource for legacy UEs in order to minimize the impact of TSS on legacy UEs.

In an alternative embodiment, the eNB could still schedule data containing the TSS. However, the eNB may use a conservative modulation and coding scheme (MCS). In this way, even though some resource elements may be punctured by the TSS, the decoding of the data used in the remaining REs in the assigned radio bearer may still be successful. If not successful, retransmission could happen and the chance that retransmission may have the same issue is relatively small. The above could remove the restriction to the scheduler for legacy UEs.

Based on the above, the solution for TSS is backwards compatible, provides for TP association through the decoding of the TSS for Release 11 onward UEs, and provides for the ability to send PRACH to the closest TP using an uplink power that is appropriate for the TP.

Figure 5:
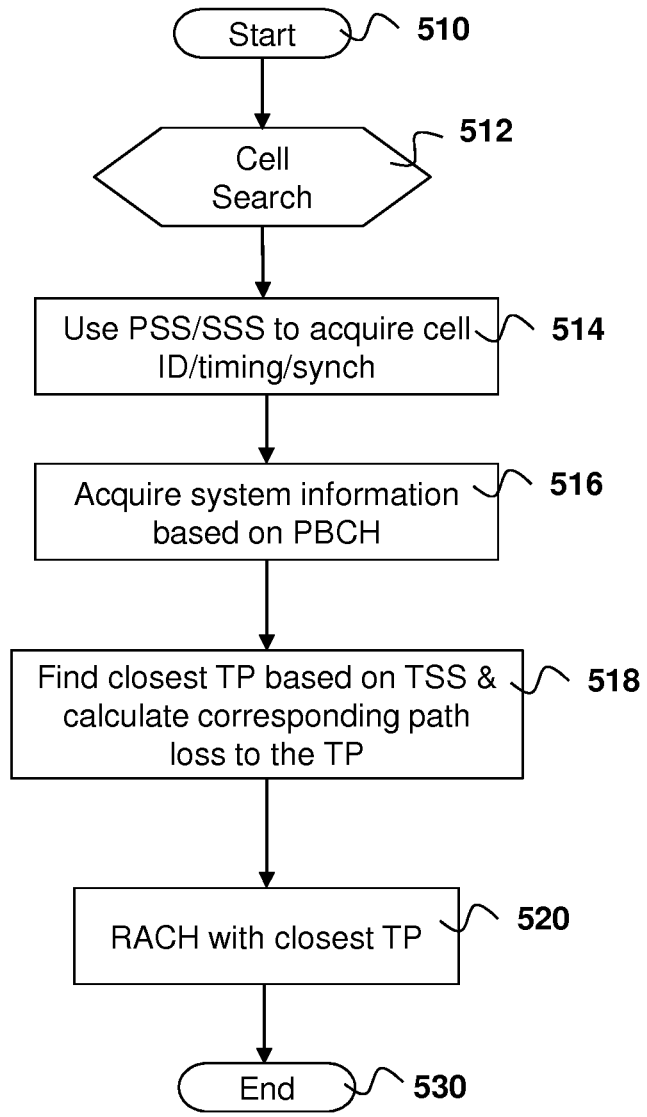
FIG. 5 is a process diagram for selecting a TP specific RACH.

Thus, reference is now made to FIG. 5, which shows a process at a Release 11 onward UE for performing an initial access procedure. The process starts at 510 and proceeds to block 512 defining an initial precondition that a cell search is being performed.

The process then proceeds to block 514 in which the PSS and SSS are used to acquire the cell identifier, OFDM symbol timing and sub-frame synchronization to the cell. The process then proceeds to block 516 in which system information is acquired based on the PBCH. For legacy UEs, CRS is used for path loss calculation to the eNB. For Release 11 and onward UEs, TSS may be used to find the closest TP and the path loss to the TP, as shown in block 518.

Subsequently, the RACH procedure may be performed with the closest TP in order to help with uplink power control. This is shown by block 520.

The process then proceeds to block 530 and ends.

TP Specific RACH Procedure

In a further embodiment, a TP specific PRACH approach is used in a system having multiple TPs sharing the same cell ID to increase PRACH capacity by exploiting spatial separation of LPNs. As described below, in one embodiment, a TP specific RACH_ROOT-SEQUENCE is assigned to each TP and is used for TP specific PRACH preamble generation. The TP specific RACH_ROOT-SEQUENCE can be broadcasted as part of the system information. Further, in another embodiment two sets of PRACH time frequency resources are provided, where one is for the macro eNB and the other is for LPNs. In this case, legacy UEs can use the PRACH configured for the macro eNB while Release 11 onward UEs can use the PRACH configuration of the closest TP, either the macro-eNB or a LPN.

In a further embodiment, for Release 11 onward UEs, the PRACH can have a specific transmit power calculation and the PRACH response transmission may be made to Release 11 onward UEs from a TP where the PRACH is detected.

Based on the above, in one embodiment the eNB could recognize Release 11 onward UEs at PRACH detection so that PRACH response messages could be sent from the closest TPs to the UE. This may allow PDSCH resource sharing for geographically separated TPs and also increase PRACH capacity.

Figure 6:
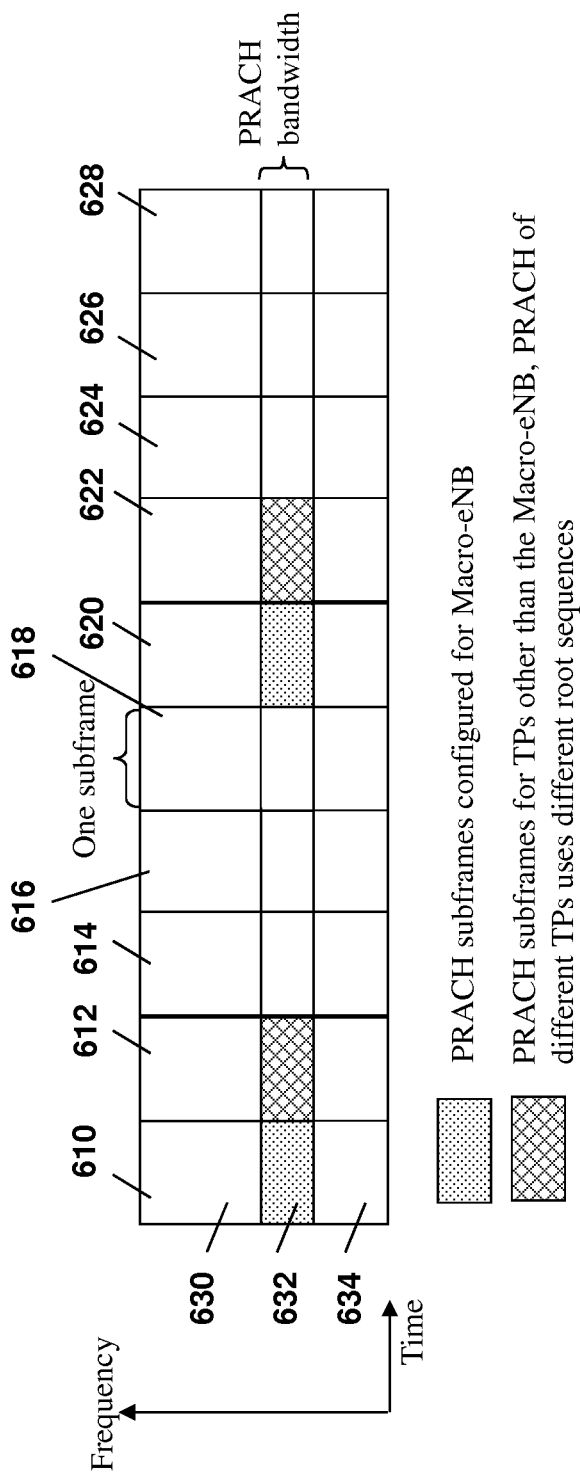
FIG. 6 is a block diagram showing separation of PRACH subframes.

Reference is now made to FIG. 6, which shows transmission of subframes in accordance with one embodiment of the present disclosure. In the embodiment of FIG. 6, the PRACH time frequency resources are split into one PRACH resource configuration for macro eNBs and another configuration for remaining LPNs in the cell. Further, different PRACH preamble sequences could be assigned to different LPN TPs.

In particular, in FIG. 6, sub-frames 610, 612, 614, 616, 618, 620, 622, 624, 626 and 628 are shown.

Each sub-frame is frequency divided as shown, for example, by areas 630, 632 and 634. Thus, for example, in sub-frame 610, area 632 could be allocated as a PRACH resource.

In accordance with one embodiment, the area 632 of sub-frame 610 is configured for PRACH for a macro eNB.

Similarly, area 632 of sub-frame 612 is configured for PRACH for other TPs other than the macro eNB. The PRACH of different TPs use different RACH_ROOT-SEQUENCE in this case to distinguish the LPN TPs from each other.

The assignment of different PRACH resources mitigates the interference between the PRACH targeting the micro eNB and PRACH targeting LPN TPs. The former PRACH could be used by legacy UEs or Release 11 onward UEs while the latter PRACH resource could be used by Release 11 onward UEs only.

Further, among Release 11 onward UEs, the assignment of different RACH_ROOT-SEQUENCE for different LPN TPs could reduce the contention of PRACHs from different UEs served by different LPN TPs, especially when overlapping LPN TPs exist. The new PRACH resource also allows reuse of PRACH resources in different LPN TPs if there is no overlap of these LPN TPs, therefore increasing the overall PRACH capacity of the cell.

In one embodiment, after having acquired the PSS/SSS and other system information of a cell in the downlink, a Release 11 onward UE decodes the number of LPN TPs deployed in the cell as well as other configuration information from each LPN TP, including TSS configuration, PRACH configuration including PRACH resource and preamble and the transmit power of each LPN TP from the system message.

The UE can then perform TSS detection and estimate the received signal strength of the TSS from each LPN TP.

Based on the received TSS signal strength and transmit power of each LPN TP, the UE can estimate the downlink propagation path loss to each LPN TP. The UE can then determine the closest LPN TP to it and use the corresponding PRACH configuration of the LPN TP for PRACH transmission.

Figure 7:
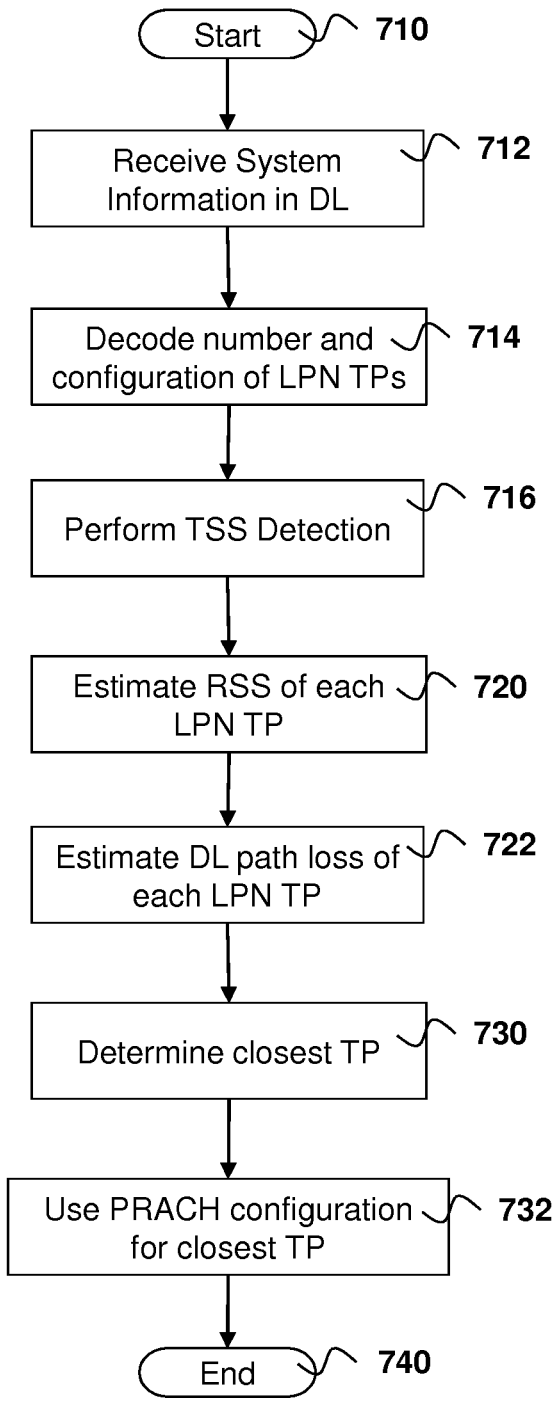
FIG. 7 is a process diagram showing PRACH configuration for a closest TP.

Reference is now made to FIG. 7. The process of FIG. 7 starts at block 710 and proceeds to block 712 in which the UE receives system information in the downlink.

The process then proceeds to block 714 in which the system information is decoded and the number and configuration of LPN TPs in the cell is determined from the system information.

From block 714 the process proceeds to block 716 in which TSS detection is performed in the cell.

The estimated received signal strength of each LPN TP is then calculated at block 720 and the process proceeds to block 722 in which the downlink path loss for each LPN TP is estimated.

Based on the estimations at block 722, the process proceeds to block 730 in which the closest TP is determined.

Thereafter, the PRACH configuration for the closest TP in accordance with the embodiment of FIG. 6 above is used for PRACH configuration, as shown at block 732, and the process then proceeds to block 740 and ends.

For legacy UEs, PRACH configuration for the macro eNB is generally used for PRACH transmission. The eNB may know whether a detected PRACH is from a legacy UE or a Release 11 onward UE because different preambles or time frequency PRACH resources are used. For legacy UEs, the PRACH response may be sent over the same antenna port as the CRS. Conversely, for a Release 11 onward UE, the PRACH response may be sent over the TP over which the PRACH is detected. For this purpose, new PDCCH with DM-RS can be used. A Release 11 onward UE could use the PRACH configuration for the macro eNB, in which case the PRACH response message may also be broadcast in the cell.

Based on the above, different PRACH resources could be configured for PRACH for macro eNB and PRACH for LPN TPs. The PRACH resource for LPN TPs can be shared among all LPN TPs.

The same set of preamble sequences could be reused among different TPs which have no overlapping coverage. Further, different sets of PRACH preamble sequences could be assigned to different LPN TPs. The PRACH configurations for the macro eNB and all LPN TPs can be transmitted through system information broadcasts over the cell.

On receipt of the PRACH, a low power node may process the PRACH for the preamble sequences, or may provide the raw data to a macro eNB or other network element to perform the processing.

Power Control

As described above, for a UE, the closest TP could be determined by the UE based on the downlink estimation from the TSS. As the UE does not have knowledge of which TPs are nearby, it could try to estimate the path loss from all TP broadcasts in the cell and detect which TPs are nearby through the path loss estimation. After the closest LPN TP is determined, the downlink path loss of the LPN TP can then be used by the UE to calculate the PRACH transmission power. This is useful since the transmission power may not too high, thereby causing interference and draining the UE battery power.

The PRACH transmission power may be calculated as follows:

$$P_{PRACH} = \min\{P_{cmax}, \text{PREAMBLE\_RECEIVED\_TARGET\_POWER} + PL\}\_[dBm], \quad (4)$$

In equation 4 above, Pcmax is the configured UE transmitted power in dBm and PL is the downlink path loss in dB, estimated from the closest LPN TP to the UE based on the TSS, which means the smallest pathloss is used among the measured pathloss value with TSSs. The PREAMBLE_RECEIVED_TARGET_POWER is the target received PRACH power at the TP and could be broadcast as part of the TP configuration information.

To maintain performance consistency in the PRACH process, subsequent transmissions from the UE to the eNB could still target the same TP for uplink power control until the PRACH process finishes or is reconfigured by the eNB.

Based on the above, PRACH power control could target the closest TP to the UE and subsequent transmissions in PRACH may then target the same TP for uplink power control.

PRACH Contention

Figure 8:
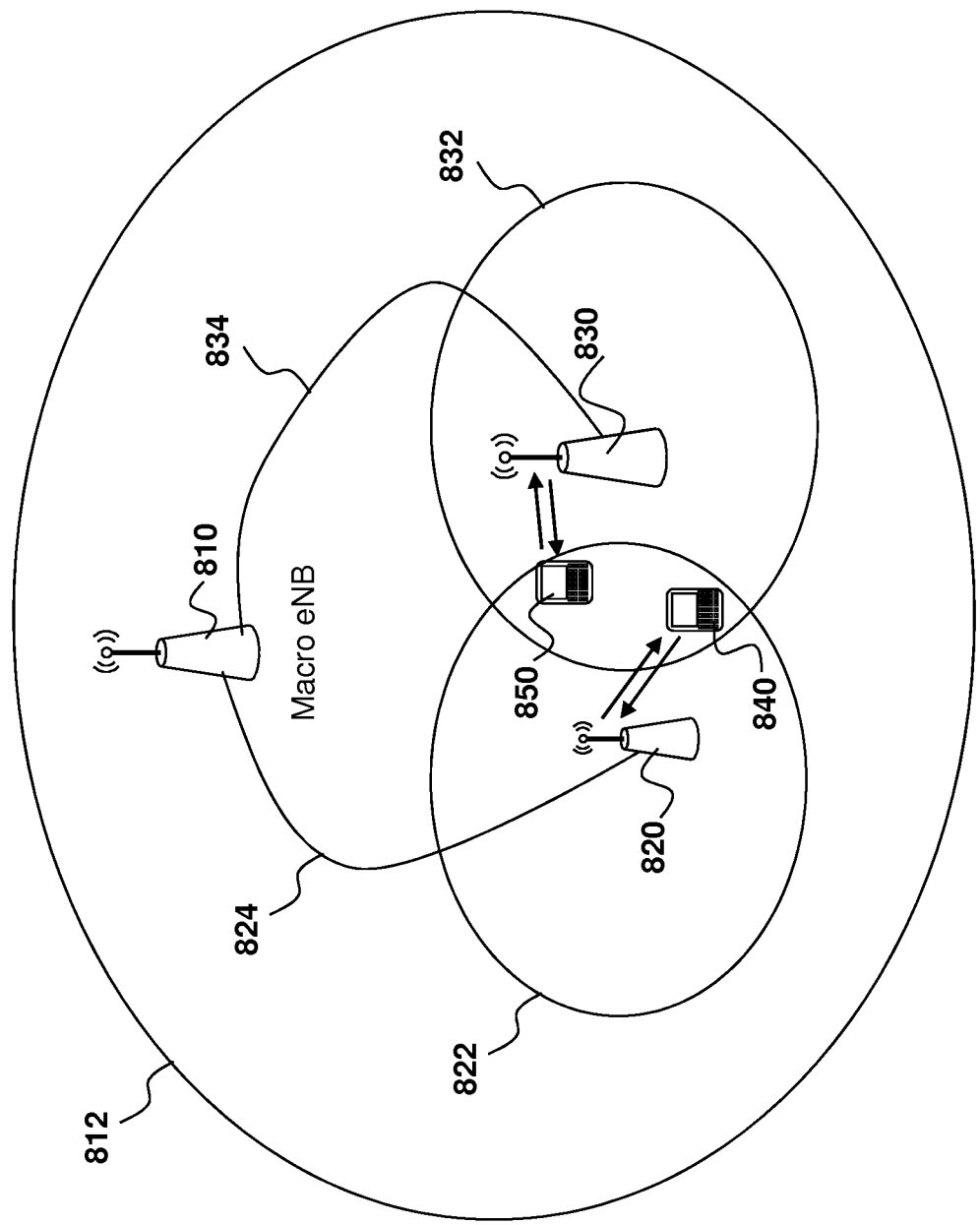
FIG. 8 is a block diagram of an architecture having two LPNs with overlapping coverage areas.

Reference is now made to FIG. 8, which shows an architecture in which a macro eNB 810 has a cell area shown by circle 812. Further, a first LPN 820 has an area 822 and a second LPN 830 has an area 832. Areas 822 and 832 are overlapping. Communication between macro eNB 810 and LPN 820 may be done, in one embodiment, over a connection 824, which may be a fiber connection in one embodiment. Similarly, communication between macro eNB 810 and LPN 830 may be done, in one embodiment, over a connection 834, which may be a fiber connection in one embodiment.

A first UE 840 is serviced by LPN 820 and a second UE 850 is serviced by LPN 830.

In the embodiment of FIG. 8, both UEs 840 and 850 are in the overlapping area in areas 822 and 832.

When UE 840 or 850 transmits a PRACH, the signals could be received by both the TPs for LPN 820 and 830. If the PRACH resource and preamble index used by the UEs for the PRACH transmission happen to be the same, the RA-RNTI for the two detected PRACH may typically be the same. Thus even if the eNB knows there two at least two UEs sending the PRACHs, the same RA-RNTI may be used for sending the corresponding RAR messages. So both of the two UEs may think the RAR messages are for them and both may respond by sending a UL message over the same time-frequency resource allocated in the RAR messages. As a consequence, either one of the two messages or no message may be received by the eNB. In the former case, one of the UEs may be successful in completing the RACH procedure. In the later case, both UEs may fail and retransmission may be needed.

To ease the contention issue, different PRACH resources could be configured for each TP to allow the eNB to send RAR with different RA-RNTIs for the two detected PRACHs in such scenarios.

Alternatively, the configuration of one set of preamble sequences for both TPs for LPN 820 and 830 could be used, instead of configuring two separate sets of preamble sequences.

Alternatively, the existing association of RA-RNTI with PRACH could be redefined for random access preamble assigned for a LPN TP. This RA-RNTI may not collide with RA-RNTI used for macro eNB. In this case, contention could be avoided in the overlapping region. The RA-RNTI associated with the PRACH in which the Random Access Preamble is transmitted based on the PRACH configuration of LPN TP k, can computed as:

$$\text{RA-RNTI} = 1 + t\_id + 10 * f\_id + N_{offset}(k) \quad (5)$$

In the equation above, t_id is the index of the first subframe of the specified PRACH ($0 \leq t\_id < 10$) in a radio frame which consists of 10 subframes, f_id is the index of the specified PRACH within that subframe, in ascending order of frequency domain ($0 \leq f\_id < 6$), and $N_{offset}(k)$ is a offest configured for LPN TP k. For example, $N_{offset}(k) = k*10*6$, $k=1, 2, \ldots, N_{TP}$ and $N_{TP}$ is the number of LPN TPs in a cell.

Reception

After the closest TP and corresponding PRACH configuration for the TP are determined, Release 11 onward UEs can send a PRACH with a transmit power $P_{PRACH}$ calculated based on equation 4 above in a time frequency resource configured for the PRACH.

Each LPN TP may perform PRACH detection based on two sets of PRACH preambles, namely the PRACH preambles configured for that specific TP and the PRACH preambles configured for the macro eNB.

In one embodiment, the actual processing can be done in a centralized manner at the macro eNB by passing the received raw data from each LPN to the macro eNB through a link between the LPN and the eNB.

When a PRACH is detected, a PRACH response (RAR) message may be sent in accordance with the following.

If the detected PRACH has a preamble that is configured for the macro eNB, the RAR should be sent from the macro eNB and all the LPN TPs where CRS are transmitted.

Conversely, if the detected PRACH has a preamble that is configured for a particular LPN TP or TPs, the RAR should be sent out from those particular LPN TP or TPs.

In one embodiment, the macro eNB performs PRACH detection based only on the PRACH configured for the macro eNB. In this case, when a PRACH is detected by the macro eNB, a RAR is sent over both the macro eNB and the LPN TPs where CRS are transmitted.

After the UE sends an LPN TP specific PRACH preamble, the PRACH preamble could be detected only on the intended LPN TP. A RACH response may then be sent over the intended LPN TP with timing and power corrections based on the measured timing and power offset at the LPN TP.

If a PRACH is sent with a preamble configured for the macro eNB, then the PRACH could be detected by more than one TP depending on the location of the UE. A RACH response may be sent over both the macro eNB and all LPN TPs where CRS are transmitted. The timing and power corrections included in the RAR message could be based on the time and power offset value measured on a TP having the best received PRACH signal quality.

Figure 9:
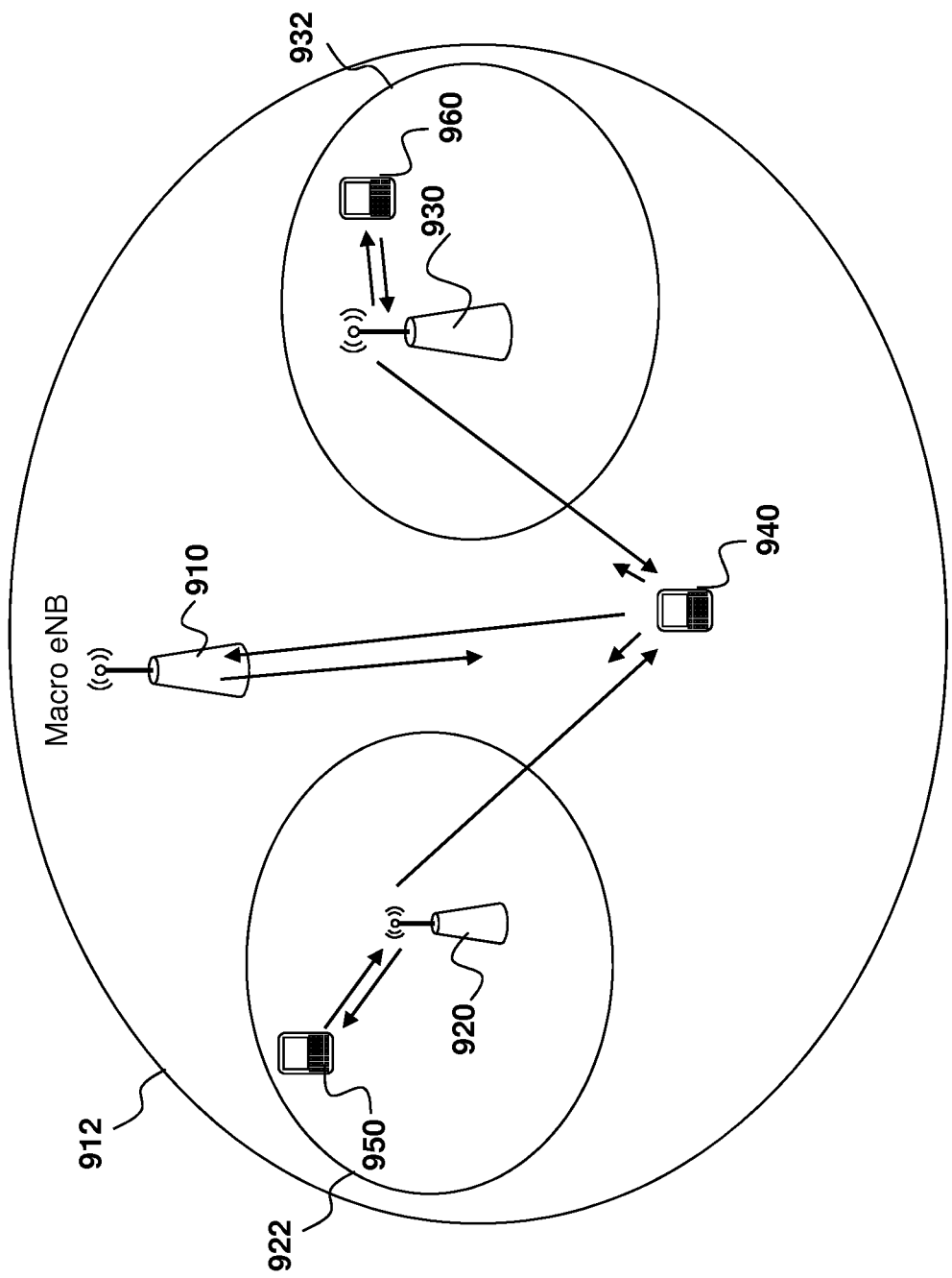
FIG. 9 is a block diagram showing a signaling to both legacy and Release 11 or post Release 11 UEs.

Reference is now made to FIG. 9, which shows macro eNB 910 having a cell area 912 and two LPNs, namely LPN 920 having an area 922 and LPN 930 having an area 932. A UE 940 is a legacy UE and may transmit its PRACH using the PRACH configuration for the macro eNB and the RACH response from the eNB may be sent over both the macro eNB 910 and the LPN TPs 920 and 930.

UE 950 and UE 960 are Release 11 and onward UEs and are associated with LPN 920 and LPN 930 respectively. UE 950 sends its PRACH to TP LPN 920 using PRACH configuration for the TP LPN 920 and is detected by TP LPN 920. A RACH response may then be sent to UE 950 over the TP LPN 920.

Similarly, UE 960 may send its PRACH using the PRACH configuration for LPN 930 and the corresponding RACH response may then be sent over only LPN 930.

The remainder of the PRACH procedure is the same as legacy PRACH procedures.

Legacy UEs could also benefit from LPNs in a cell in terms of PRACH performance because the PRACH from legacy UEs could be detected by a close LPN TP and thus could have better detection probability than a macro eNB. In addition, the RACH response could be sent over the macro eNB and all LPN TPs, which increases the received signal strength.

For Release 11 onward UEs, the PRACH response could be sent locally over the TP from which the PRACH is detected and thus the same PRACH resource could be reused by different TPs that have little or no overlap in terms of coverage. This increases the overall PRACH capacity of the cell and mitigates interference.

Uplink and Downlink TP Selection for a UE for Joint Transmission and Reception

In a system where LPNs are deployed in a cell with the same cell ID, the one downlink transmission strategy to a UE may be to transfer downlink signals from only the TPs providing a highest DL signal quality at the UE. Similarly, one reception strategy at the UL may be to receive signals from a UE at only the TPs with a highest uplink signal quality. The process for determining the set TPs for the downlink transmissions and uplink transmissions from the UE is referred to as TP selection.

The association between a TP and a UE could built up at various points, including during initial PRACH, and based on uplink signal measurement before downlink CSI feedback is configured, or based on DL CSI feedback after DL CSI feedback is available, or based on UE assisted TP selection.

Because transmission power at different TPs could be different, a TP or a set of TPs that are good for downlink transmission to a UE may not necessarily be good for uplink reception from the same UE. Therefore, the transmit set of TPs for a UE may not be the same as the receiving set of TPs for the same UE.

Based on the above, in the embodiments described herein, two sets of TPs may be defined, namely one set of transmitting TPs and one set of receiving TPs. In some embodiments, these two sets of TPs could overlap each other or one set of TPs could be a subset of the other set of TPs. For example, the receiving set of TPs could be a subset of the transmit set of TPs.

The two sets of TPs may be selected for each UE or a group of UEs, where one set is for the transmit TP for downlink transmission and the other set is for the receiving TP for uplink transmission.

After such TP selection, the eNB could schedule downlink data transmission to the UE from only the set of selected TPs in the downlink. Similarly, the eNB may perform uplink data reception from the UE over only the set of selected TPs in the uplink.

In one embodiment, the TP selection could be done by the eNB in two stages. In a first stage, the UE is accessing the network and in stage two the UE enters the network.

In stage 1, the eNB does not have downlink CSI feedback from the UE. The TP selection could be performed at the eNB based on uplink received signals such as PRACH or PUSCH received from different TPs. For example, the eNB could determine the best TP for uplink reception for a UE during the PRACH process as described above.

However, the TP for best downlink transmission may be different when different transmit powers are used at the TPs. In general, the TPs for downlink transmission and TPs for uplink reception could be determined based on the received signal quality at multiple TPs as well as transmit power of each TP.

In a first embodiment, the received signal strength or signal to inference plus noise ratio (SINR) from the UE at different TPs could be ranked in order. For example, the received signal strength from a UE at a first TP could be ranked highest if it has the highest signal strength, followed by the next TP with the next highest signal strength and so on until all TPs in the cell are ranked. The first TP, or in some cases multiple TPs, could be selected as candidates for a set of TPs to be selected for the UE in the uplink. In this case, the number of TPs selected could be preconfigured.

In a further embodiment, a threshold could be used in TPs whose received signal strength or signal to interference plus noise ratio from the UE are above the threshold. The TPs exceeding the threshold could be considered as candidates for the set of TPs to be selected for the UE in the uplink transmission. For example, M is selected such that $P_{RSS}^{UL}(k_i) \geq \alpha_{th}$ where $\alpha_{th}$ is a threshold, and $\{k_0, k_1, \ldots, k_{M-1}\}$. This set of TPs could be considered as the receiving TP for the UE.

For downlink transmission, the downlink signal strength at the UE from each TP could be estimated based on uplink received signal strength at the TP and the transmit power of the TP, since the received signal strength is an indication of path loss. For example, the normalized downlink received signal strength of the UE from the TP could be estimated as a combination of uplink received single strength and downlink transmit power such that $\hat{P}_{RSS}^{DL}(i)=P_{TX}(i) \, P_{RSS}^{UL}(i)$, $i=0, 1, \ldots, N_{TP}-1$. The downlink power can be reordered $\{\hat{P}_{RSS}^{DL}(k_0) \geq \hat{P}_{RSS}^{DL}(k_1) \geq \ldots \geq \hat{P}_{RSS}^{RL}(k_{N_{TP}-1})\}$, $k_m \in \{0, 1, \ldots, N_{TP}-1\}$. The first few TPs with the strongest downlink signal strength at the UE could be selected as candidates for the set of TPs to be associated with the UE in the downlink transmission. For example, the first M (M $N_{TP}$) TPs may be selected as the set of downlink TPs, where M could be either configured or predetermined based on a predetermined threshold. This set of TPs could be considered as the transmit TP for the UE.

If the transmit power of each TP is the same, the transmit set of TPs could be the same as the receiving set of TPs. However, if the transmit powers of the TPs are different, the two sets of TPs could be different. The UE may or may not be aware of the process for determining the uplink and downlink TPs.

Alternatively, if TP specific signals such as CSI-RS could be conveyed to the UE through system information, the path loss seen at the UE from each TP could be derived by the UE through measured received signal strength of the TP specific signals at the UE and the transmit power of each TP. The above procedures could still be used to derive transmit and receive sets of TPs.

In a further embodiment, the potential sets of TPs could be derived at the UE and fed back to the eNB. To support this, corresponding signaling may be needed which in general may be higher level signaling such as RRC. The eNB could configure the UE to determine such sets of TPs by providing requirements such as the number of TPs in a set and the thresholds. The UE may then need to feedback the TP index of each set of TPs and update them on a semi-static basis.

The set of TPs determined during an initial access stage for downlink transmission could be further adjusted or updated later after the UE has entered the network.

After TP selection has been performed at stage one, two sets of TPs could be selected for the UE by the eNB, one for uplink and the other for downlink. The two sets of TPs can be continually updated through downlink or uplink measurement and CSI feedback from the UE after downlink CSI feedback is available at the eNB. Based on the initial set of TPs selected for the UE for downlink transmission, the eNB could configure the UE with multiple sets of TP specific CSI-RS, one for each TP. The UE may be asked to feedback downlink channel measurements for each of the TPs based on the sets of configured CSI-RS. These channel measurements may be used by the eNB to refine the initial set of TPs.

For example, the CSI-RS of neighbor LPN TPs, which are not currently associated with the UE, could also be informed to the UE and the channel measurement also conducted on these set of CSI-RS, similar to neighboring cell Reference Signal Received Power (RSRP) or Reference Signal Received Quality (RSRQ) measurement done by legacy UE based CRS.

Based on such measurements, the eNB could further refine the UE association with the LPN TP and make adjustments, if needed. For example, if the UE is currently associated with TP 0 and TP 1 but moving away from TP 0 to get closer to TP 2, based on the channel measurement feedback, at certain points the eNB could change the association of the UE from TP 0 and TP 1 to TP 1 and TP 2. Such association change could be signaled to the UE explicitly or implicitly through reconfiguration of the sets of CSI-RS or TSS to the UE.

The set of transmit TPs may be signaled to the UE directly or indirectly. For example, the sets of CSI-RS ports associated with the transmit set of TPs could be signaled to the UE instead of the TPs themselves. The set of received TPs may not need to be signaled to the UE as may be implemented on the network.

Figure 10:
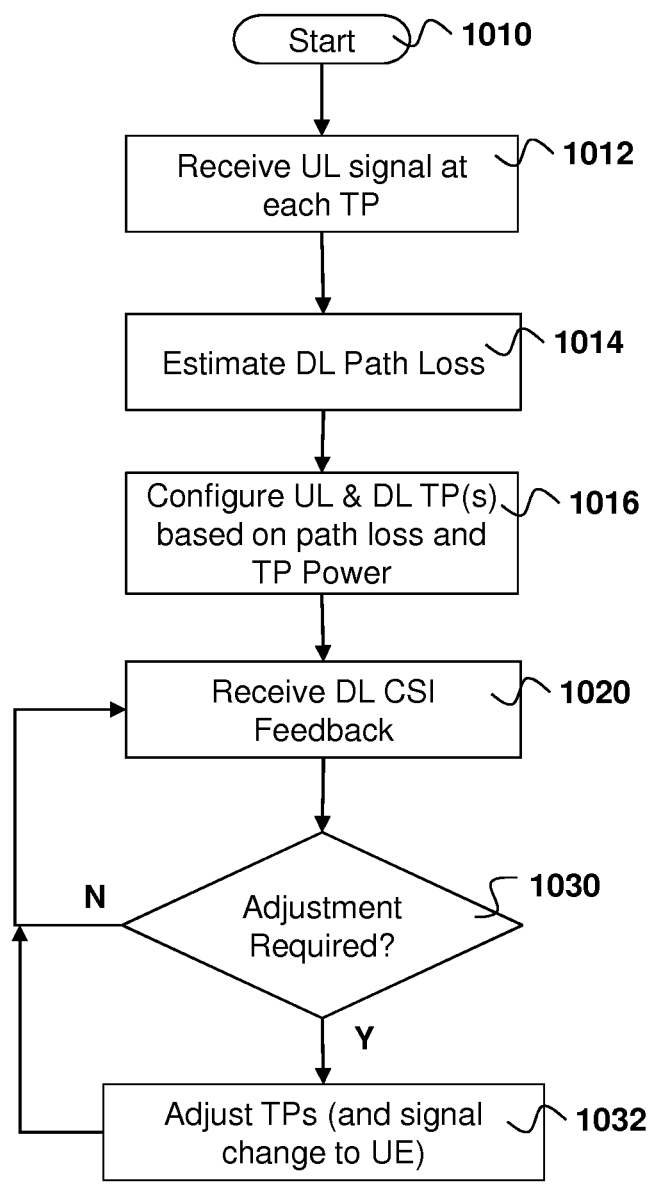
FIG. 10 is a process diagram showing two stage configuration of uplink and downlink TPs.

Reference is now made to FIG. 10, which shows a network side implementation. The process of FIG. 10 starts at block 1010 and proceeds to block 1012 in which a network element receives the uplink signal at each TP.

The process then proceeds to block 1014 in which the network element estimates the downlink path loss at the UE for each TP.

Based on the calculation of block 1014 the process proceeds to block 1016 in which the downlink TPs for the UE are configured based on the path loss and the TP transmit power.

The process then proceeds to block 1020 in which the network element receives downlink CSI feedback from the UE.

The process then proceeds to block 1030 and checks whether an adjustment based on the received downlink CSI feedback is required. If no, the process proceeds back to block 1020 to continue to receive downlink CSI feedback. Conversely, if an adjustment is required in the TPs, the process proceeds to block 1032 in which the TPs are adjusted and optionally the adjustment is signaled to the UEs. The process then proceeds back to block 1020 to continue to receive downlink CSI feedback.

In a further embodiment, the UE may assist in the TP selection. In particular, to alleviate the potential for large feedback overhead with the above implementations, a UE assisted TP selection procedure could be used.

In the embodiment, a UE may measure CSI from all TPs configured by the eNB. However, instead of feeding back all CSI for all the TPs, the UE may perform some further processing such as throughput estimation with joint transmission to determine a subset of TPs that may provide better signal quality for the UE. The feedback may be referred to as a feedback TP set. The eNB could also signal the TP subset that requires the measurements (RSRP/RSRQ) from the UE side. This could be done via the measurement configuration procedure. If without such signaling, the UE may need to measure all detected TPs.

The UE then feeds back only the CSI corresponding to the feedback TP set. The eNB can use this feedback information to determine the TP set for the UE. In accordance with the above, unnecessary feedback for the CSI can be reduced and the efficiency of the TP selection process can be maintained.

In one embodiment, the number of TPs in the UE determined feedback TP set and the TP indices may be included as part of the feedback information. In other embodiments, the number of TPs for downlink CSI feedback from the UE may be configured by the eNB through downlink control signaling. In this way, the eNB already knows the size of the feedback TP set and can correctly decode the CSI.

In a further alternative embodiment, the eNB could configure the maximum number of TPs for downlink CSI feedback from a UE. In this case, the UE has the option to feedback the CSI for a smaller number of TPs than what was suggested by the eNB. This could be done by using a bitmap sequence. In other words, the size of the sequence could equal the configured TPs for possible feedback and each bit corresponds to a configured TP. Then, the number of ones in the bitmap determines the size of the UE determined candidate TP set and the location of the ones in the sequence indicates the TPs selected by the UE.

UE Uplink Power Control

In Release 8, 9 or 10 legacy mobile devices, the downlink path loss is estimated by the UE using both measured received reference signal power (RSRP) based on the CRS and the transmit power at the eNB, which is broadcast in the cell. The UE compensates for the estimated path loss by increasing the transmit power in the uplink to achieve certain target received signal power levels at the eNB.

In a system with multiple LPN TPs sharing all the same cell identifier as the macro eNB, one issue is how to estimate the path loss at the UE for each individual TP. A further issue is how to determine which path loss should be used for the UE power control.

As CRS is transmitted from both the macro eNB and LPNs, the path loss measured on CRS is a composite path loss for both the macro eNB and LPNs to the UE. In such a situation, the estimated path loss based on the received signal and the transmit power from the macro eNB may lead to an incorrect path loss estimation. For example, if a UE is very close to an LPN while it is far away from the macro eNB, the received signal at the UE may be mainly from the contribution of the LPN. Ideally, the path loss between the LPN and the UE should be used for the uplink power adjustment at the UE so that a correct received signal level at the LPN can be achieved.

However, when a nearby LPN is the main contributor to the received signal at the UE, the estimated path loss between the LPN and the UE based on the macro eNB transmit power may give a larger than actual path loss estimation and lead the UE to use a higher than desired transmit power from the LPN perspective. This may introduce strong interference to other UEs assigned to an adjacent frequency.

One possible solution to the above is that the eNB may use the LPN as a reference for power correction calculation for close loop power control starting from the PRACH. In this embodiment, the received power at the LPN may be correct after a number of power correction cycles under close loop power control and thus, the interference should be reduced and removed eventually. Any of the initial impact on the PUSCH due to strong interference could be mitigated by HARQ retransmissions. However, PUCCH transmission at the adjacent frequency of the PRACH may be affected by an initial PRACH transmission from legacy UEs. As such, PRACH could be assigned apart from the PUCCH to ease its interference to the PUCCH.

Based on the above, uplink power control could be an implementation issue for a system with a LPN and the PRACH resource could be assigned apart from the PUCCH to ease interference from the PRACH to the PUCCH.

For Release 11 and onward UE, with the introduction of TSS for each LPN TP as well as broadcasting such configuration together with TP transmission power of all TPs in a cell, it could estimate the path loss for each TP based on the received signal strength of the TSS and the transmit power of each TP. After having the path loss between the UE and each TP, the UE could perform uplink transmit power calculation based on an uplink reference TP. The uplink reference TP may be determined in various ways.

In a first option, a reference TP may be determined by the UE. In other words, the TP with the minimum path loss to the UE could be selected as the reference TP for uplink power control. The corresponding path loss as well as the target-received power if configured for the TP could then be used for uplink power calculation at the UE. With this option, a minimum transmit power may be used by the UE and high power savings may be achieved. This option could be used for uplink power control during PRACH process or even after PRACH process unless the reference TP is reconfigured by the eNB.

The TP chosen for the uplink power control may need to be signaled to the eNB from the UE. Such signaling could be based on a request made from the eNB in one embodiment.

The signal from the UE could include the TP index and the corresponding path loss. In one embodiment, the eNB could override the TP chosen by the UE and signal the UE to use a different TP as the uplink power control reference. The UE may then use that signaled TP to calculate the DL path loss from the TP and use the path loss for calculating the uplink transmit power.

Figure 11:
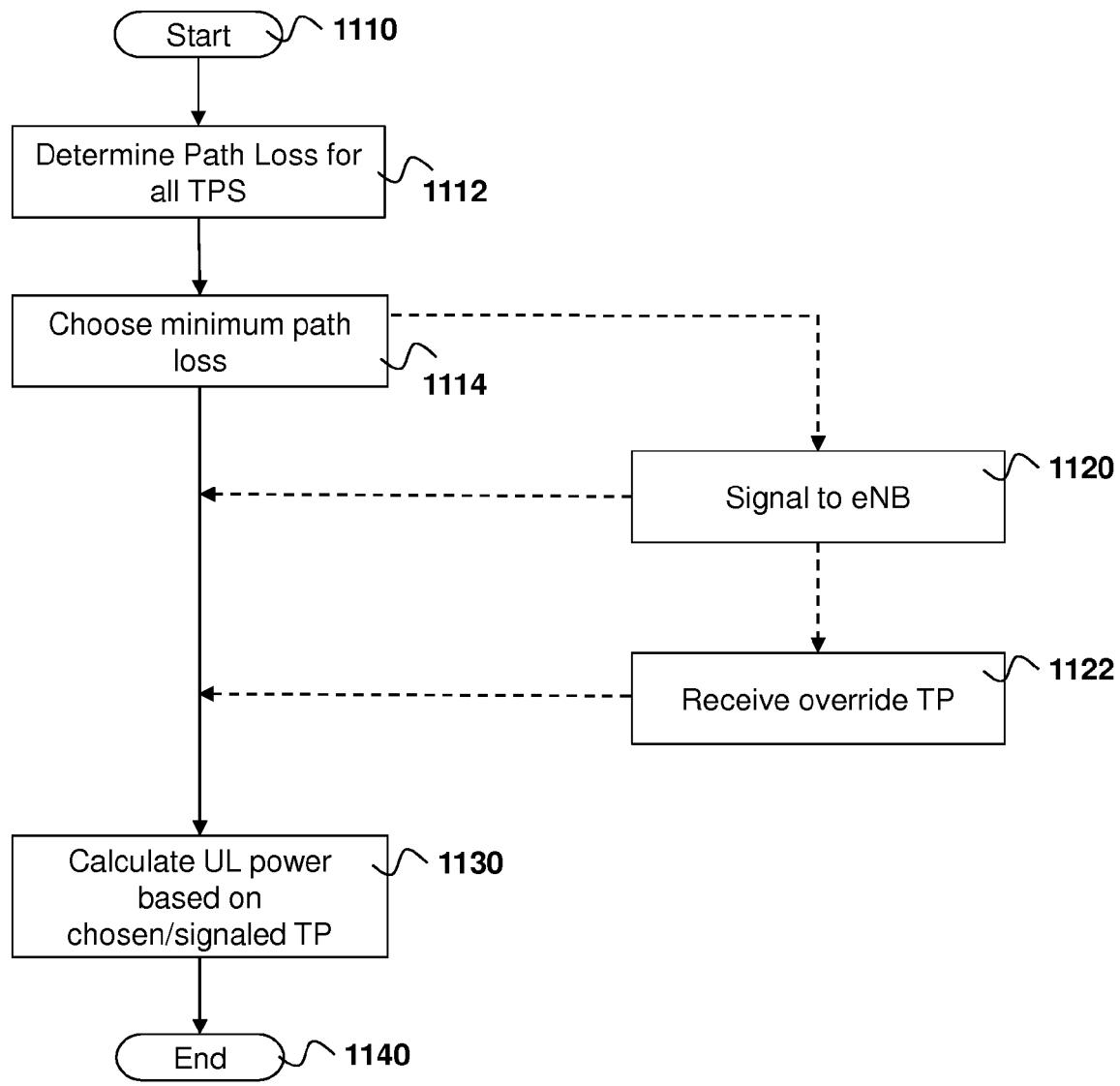
FIG. 11 is a process diagram for a UE selection of a reference uplink TP.

Reference is now made to FIG. 11, which shows power calculation based on UE selection. The process of FIG. 11 starts at block 1110 and proceeds to block 1112 in which the path loss for all TPs is determined at the UE.

The process then proceeds to block 1114 in which the TP with the minimum path loss is chosen.

In one embodiment, the process may proceed from block 1114 to 1120 to signal the chosen TP to the eNB. The eNB may then optionally override the selection, and the override may be signaled to the UE, as shown at block 1122.

The process then proceeds from blocks 1114, 1120 or 1122 to block 1130 in which uplink power is calculated based on the chosen TP (or signaled TP) path loss.

The process then proceeds to block 1140 and ends.

In a second option, the eNB could determine the reference TP. In this option, the eNB could use the reported reference signal received power (RSRP) measurements or received signal strength and/or SINR of uplink signals from the UE at different TPs to determine a reference TP. For example, the TP with the strongest received signal or highest SINR could be selected as the reference TP. The uplink signal for this purpose could include the PUSCH. PUCCH and sounding reference signals (SRS).

The eNB then signals the TP to the UE either dynamically or semi statically. In the case of semi static signaling, the eNB can directly inform the UE about the reference TP for the path loss measurement through RRC signaling.

Reference is now made to Table 2 below which shows a bitmap pathlossreference-r11 to indicate the reference TP. pathlossreference-r11 is included in RRC signaling from the eNB to the UE. Here N is the length of the bitmap and is the total number of TPs in the set. The set of TPs could be all TPs deployed in the cell or a subset of such TPs. For example, the set of TPs could be the received set of TPs for a particular UE.

TABLE 2

| Example IE | |
|---|---|
| { UplinkPowerControlDedicated-r11 ::= ....omitted.... pathlossReference-r11 } | SEQUENCE { BIT STRING SIZE(N) |

The bit map could be added to the existing information element (IE) UplinkPowerControlDedicated or other IEs, which is described in LTE Release 10 RRC specification 36.331 v10.20.0 and is sent from eNB to a UE for UL power control.

If a bit is set to "1" in the bitmap, the corresponding TP is then selected as a reference TP for the uplink power control. The identity of a TP could be indirectly indicated by other cell specific configurations such as CSI-RS. For example, the TP could be identified by its CSI-RS configuration index.

In a further embodiment, the reference TP for a UE could be indicated together with other TP configurations for the particular UE. This is shown below with regard to Table 3, where the downlink serving TP for the UE is indicated as TP 0 while the uplink reference TP is indicated as TP 1 and the corresponding CSI-RS port is provided.

The downlink serving TP or transmit TP may not need to be signaled to the UE explicitly as this case be represented by associated CSI-RS ports. The uplink reference TP could be a number of TPs, in which case the uplink power control could be calculated based on a function of the path loss from these TPs, for example, average path loss or maximum/minimum of the path loss.

TABLE 3

An example of reference TP configuration and signalling for a UE

|  | TP0 | TP1 | TP2 | ... |
|---|---|---|---|---|
| CSI-RS configuration | CSI-RS config x, | CSI-RS config y | CSI-RS config z | ... |
| DL serving TP bit map | 1 | 0 | 0 | ... |
| UL reference TP bit map | 0 | 1 | 0 | ... |

A third alternative embodiment, the reference TP could be determined based on a combination of both the UE and the eNB. For example, the UE could send a list of TPs based on the path loss calculation and the eNB could make the final decision based on feedback from the UE as well as it s own measurements of received uplink signal strength. This reference TP could be updated from time to time and the updated reference TP may be signaled to the UE.

The reference TP is signaled to the UE through higher layer signaling. Both a list of TPs sent from the UE to the eNB and the final section of the reference TP by the eNB could be signaled using a bitmap format as described above.

When the eNB determines the reference TP for path loss measurements at the UE, the UE may need to monitor if path loss measured with a non-reference TP becomes smaller than the path loss measured with the reference TP. If the path loss measured from the non reference TP or antenna port becomes smaller within a margin of that measured from the reference TP or an antenna port, the UE could switch the reference TP and signal to the eNB such switching, or the UE could signal such change to the eNB to have the eNB make the decision if the UE needs to switch the reference TP or antenna port.

As the set of TPs for the best downlink transmission to the UE could be different from the TPs for best reception from the UE, the TP for uplink power control may be different from that from the downlink CSI measurement and feedback.

The TP specific signal used herein may not be limited to TSS or the CSI-RS ports described and could be other RS ports, either newly designed or reused antenna ports from previous releases. For example, if some CRS ports are configured and used in the system, they can be reused as TP specific RS and used for path loss measurements for the uplink power control.

In the above, for Release 11 onward UEs, the uplink power control in the system with LPNs could be based on a reference TP or number of reference TPs. The determination of such reference TP could be done by the UE, the eNB or by both. The reference TP then could be signaled to the UE based on a bitmap signaling and the determination of the reference TP the uplink power control (open loop) could be calculated based on a function of path loss from the reference TP or TPs.

The above may be implemented by any network element. A simplified network element is shown with regard to FIG. 12.

Figure 12:
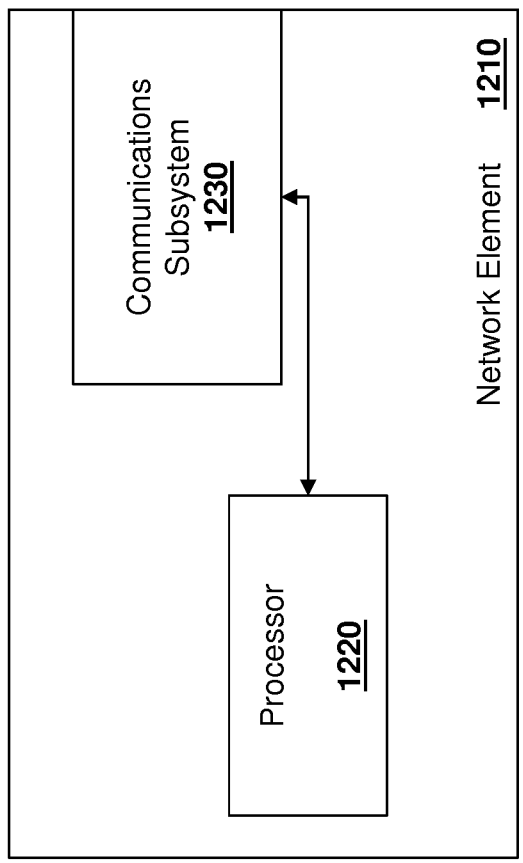
FIG. 12 is a block diagram of a simplified network element capable of being used with the methods and systems herein.

In FIG. 12, network element 1210 includes a processor 1220 and a communications subsystem 1230, where the processor 1220 and communications subsystem 1230 cooperate to perform the methods described above.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate.

Network access requirements will also vary depending upon the type of network 1319. In some networks network access is associated with a subscriber or user of UE 1300. A UE may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
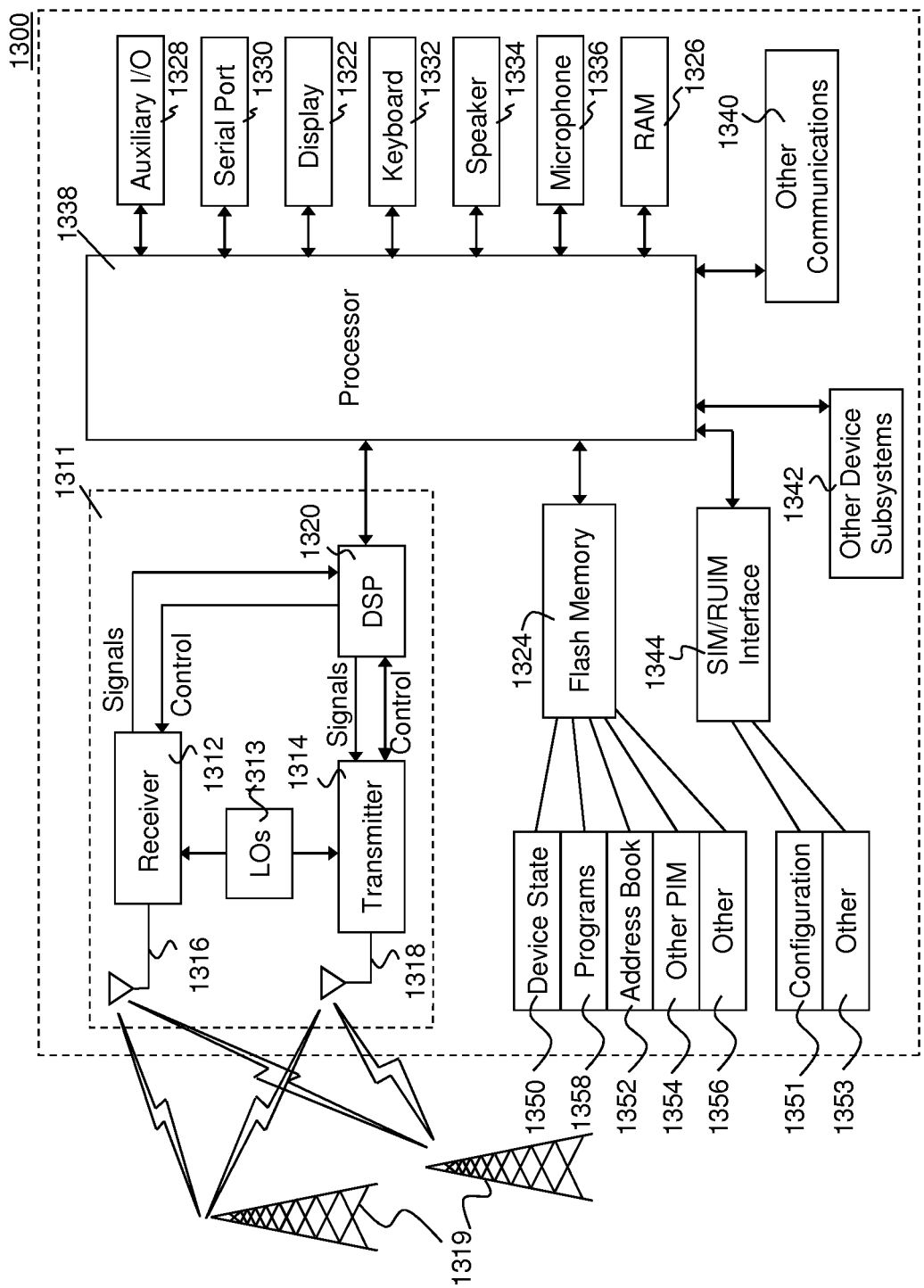
FIG. 13 is a block diagram of an example user equipment.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals may typically be output to a speaker 1334 and signals for transmission may be generated by a microphone 1336. Alternative voice or audio I/O subsystems, such as a voice message recording subsystem, may also be implemented on UE 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13 may normally be implemented in a personal digital assistant (PDA)-type UE for which synchronization with a user's desktop computer (not shown) may be desirable, but is an optional device component. Such a port 1330 may enable a user to set preferences through an external device or software application and may extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX.

In a first generalized embodiment, the above therefore provides a method at a user equipment operating in a wireless network having a plurality of transmission points including a macro evolved Node B ('eNB') and at least one low power node ('LPN') having transmit power lower than that of the macro eNB, the method comprising: receiving, by the user equipment, transmissions from a plurality of transmission points, each transmission having a transmission point specific signal ('TSS') and performing, by the user equipment, power calculations based on the transmissions.

Further the TSS is transmitted in the same subframe and radio bearer as a primary synchronization signal.

Further, the TSS is transmitted over separate frequency and time resources from the primary synchronization signal.

Further, the first generalized embodiment comprises reporting at least one of received TSS signal strength and identity of nearby LPN based on TSS signal strength.

In a second generalized embodiment, the above provides a user equipment operating in a wireless network having a plurality of transmission points including a macro evolved Node B ('eNB') and at least one low power node ('LPN') having transmit power lower than that of the macro eNB, the user equipment comprising: a processor; and a communications subsystem, wherein the processor and communications subsystem cooperate to: receive transmissions from a plurality of transmission points, each transmission having a transmission point specific signal ('TSS') and perform power calculations based on the transmissions.

Further, the TSS is transmitted in the same subframe and radio bearer as a primary synchronization signal.

Further, the TSS is transmitted over separate frequency and time resources from the primary synchronization signal.

Further, the second generalized embodiment provides reporting at least one of received TSS signal strength and identity of nearby LPN based on TSS signal strength.

In a third generalized embodiment, the above provides a method at a network element operating in a wireless network, the wireless network having a plurality of transmission points including a macro evolved Node B ('eNB') and at least one low power node, the method comprising: sending a signal from the transmission point, including a transmission point specific signal ('TSS') to distinguish between the plurality of transmission points.

Further, the TSS is generated from a Zadoff-Chu sequence.

Further, the TSS has a different cyclic shift than a TSS from other transmission points in a cell.

In a fourth generalized embodiment, the above provides a network element operating in a wireless network, the wireless network having a plurality of transmission points including a macro evolved Node B ('eNB') and at least one low power node, the network element comprising: sending a signal from the network element, including a transmission point specific signal ('TSS') to distinguish between the plurality of transmission points.

Further, the TSS is generated from a Zadoff-Chu sequence.

Further, the TSS has a different cyclic shift than a TSS from other transmission points in a cell.

In a fifth generalized embodiment, a method at a user equipment operating in a wireless network having a plurality of transmission points including a macro evolved Node B ('eNB') and at least one low power node ('LPN') having transmit power lower than that of the macro eNB, the method comprising: measuring, by the user equipment, channel state information from a plurality of transmission points; processing, by the user equipment, the channel state information to derive a subset of transmission points from the plurality of transmission points; providing, by the user equipment, a report to a transmission point for the subset of transmission points; and receiving a selection for at least a set of transmission points for at least one of an uplink reception and downlink transmission for the user equipment.

Further, the processing includes throughput estimation.

Further, the subset includes a number of transmission points configured by a network element.

Further, the configuration is performed over downlink control signaling.

Further, the providing utilizes a bitmap.

In a sixth generalized embodiment, the above provides a user equipment operating in a wireless network having a plurality of transmission points including a macro evolved Node B ('eNB') and at least one low power node ('LPN') having transmit power lower than that of the macro eNB, the user equipment comprising: a processor; and a communications subsystem, wherein the processor and communications subsystem cooperate to: measure channel state information from a plurality of transmission points; process the channel state information to derive a subset of transmission points from the plurality of transmission points; provide by the user equipment, a report to a transmission point for the subset of transmission points; and receive a selection for at least a set of transmission points for at least one of an uplink reception and downlink transmission for the user equipment.

Further, the processing includes throughput estimation.

Further, the subset includes a number of transmission points configured by a network element.

Further, the configuration is performed over downlink control signaling.

Further, the providing utilizes a bitmap.

In a seventh generalized embodiment, the above provides a method at a network element operating in a wireless network having a plurality of transmission points including a macro evolved Node B ('eNB') and at least one low power node ('LPN') having transmit power lower than that of the macro eNB, the method comprising: finding, at the network element, received signal strength from a user equipment at each transmission point; and selecting at least one transmission point to receive the uplink signal from the user equipment.

Further, the seventh embodiment comprises removing the transmission points from the finding step if the signal strengths received at this transmission points are below a threshold.

Further, the selection is updated based on a measurement and feedback of Channel State Information Reference Signal.

In an eighth generalized embodiment, the above provides a network element operating in a wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: find received signal strength from a user equipment at each transmission point; and select at least one transmission point to receive the uplink signal from the user equipment.

Further, the processor and communications subsystem further cooperate to remove the transmission points from the finding step if the signal strengths received at this transmission points are below a threshold.

Further, the selection is updated based on a measurement and feedback of Channel State Information Reference Signal.

In a ninth generalized embodiment, the above provides a method at a network element operating in a wireless network having a plurality of transmission points including a macro evolved Node B ('eNB') and at least one low power node ('LPN') having transmit power lower than that of the macro eNB, the method comprising: finding, at the network element, at least one downlink transmission point for a user equipment, the finding of the downlink transmission point using an estimated signal strength and transmit power for each transmission point, wherein the received signal strength is estimated at the user equipment from each transmission point.

Further, the finding chooses the transmission point based on a highest estimated downlink signal strength plus transmit power.

Further, the ninth embodiment comprises removing the transmission points from the finding step if the signal strengths received at this transmission points are below a threshold.

Further, the selection is updated based on a measurement and feedback of Channel State Information Reference Signal.

In a tenth generalized embodiment, the above provides a network element operating in a wireless network having a plurality of transmission points including a macro evolved Node B ('eNB') and at least one low power node ('LPN') having transmit power lower than that of the macro eNB, the network element comprising: a processor; and a communications subsystem, wherein the processor and communications subsystem cooperate to: find, at the network element, at least one downlink transmission point for a user equipment, the finding of the downlink transmission point using an estimated signal strength and transmit power for each transmission point, wherein the received signal strength is estimated at the user equipment from each transmission point.

Further, the finding chooses the transmission point based on a highest estimated downlink signal strength plus transmit power.

Further, the processor and communications subsystem further cooperate to remove the transmission points if the signal strengths received at this transmission points are below a threshold.

Further, the selection is updated based on a measurement and feedback of Channel State Information Reference Signal.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment operating in a wireless network having a plurality of transmission points including a macro evolved Node B ('eNB') and at least one low power node ('LPN') having transmit power lower than that of the macro eNB, the method comprising:
    finding, at the user equipment, at least two reference transmission points, one of the at least two reference transmission points having a lowest path loss to the user equipment, the lowest path loss being calculated based on a received transmission point specific signal and a received transmit power of the one of the at least two reference transmission points;
    performing, by the user equipment, uplink power control calculated based on a function of the path loss from the at least two reference transmission points; and
    signaling, at any time after the finding, at least one of the reference transmission points to a network element in the wireless network.

2. The method of claim 1, wherein the user equipment uses the transmission point specific signal to distinguish between transmission points.

3. The method of claim 2, where a transmission point specific signal occupies at least one of certain time and frequency resources, and distinguishes different TPs in at least one of time, frequency, and coding domain.

4. The method of claim 2, wherein a configuration of the transmission point specific signal is signaled in a cell.

5. The method of claim 1, wherein the signaling includes a transmission point index.

6. The method of claim 1, wherein the signaling includes a bitmap of possible transmission points having numeral one for at least one of the reference transmission points.

7. The method of claim 1, wherein the finding comprises sending a list of transmission points from the user equipment to a network element and receiving the reference transmission points from the network element.

8. A user equipment operating in a heterogeneous network having a plurality of transmission points including a macro evolved Node B ('eNB') and at least one low power node ('LPN') having transmit power lower than that of the macro eNB, the user equipment comprising:
    a processor; and
    a communications subsystem,
    wherein the processor and communications subsystem cooperate to:
    find, at the user equipment, at least two reference transmission points, one of the at least two reference transmission points having a lowest path loss to the user equipment, the lowest path loss being calculated based on a received transmission point specific signal and a received transmit power of the one of the at least two reference transmission points;
    perform, by the user equipment, uplink power control calculated based on a function of the path loss from the at least two reference transmission points; and
    signal, at any time after the finding, at least one of the reference transmission points to a network element in the wireless network.

9. A method at a user equipment operating in a wireless network, the method comprising:
    receiving, at the user equipment, information indicating a transmission point specific signal (TSS) for each of a plurality of transmission points (TPs) in the wireless network all having the same cell identifier, the plurality of TPs including a macro evolved Node B (eNB) and at least one low power node (LPN) having transmit power lower than that of the macro eNB, each TSS uniquely identifying a TP in the plurality of TPs all having the same cell identifier;
    finding, at the user equipment, at least two reference transmission points based on TSSs received at the user equipment separately from one or more reference signals received at the user equipment; and
    performing, by the user equipment, uplink power control calculated based on a function of the path loss from the at least two reference transmission points.

10. The method of claim 9, wherein the received TSSs are based on at least one Zadoff-Chu sequence.

11. The method of claim 9, wherein the finding includes finding a transmission point having a lowest path loss to the user equipment.

12. The method of claim 11, wherein the lowest path loss to the user equipment is determined based on a received transmission point specific signal and a received transmit power of the reference transmission point with the lowest path loss.

13. The method of claim 9, further comprising signaling, at any time after the finding, at least one of the reference transmission points to a network element in the wireless network.

14. The method of claim 13, wherein the signaling includes at least one of a transmission point index and a bitmap of possible transmission points having numeral one for the at least one reference transmission point.

15. The method of claim 9, wherein the finding comprises sending a list of transmission points from the user equipment to a network element and receiving the reference transmission points from the network element.

16. The user equipment of claim 8, wherein the transmission point specific signals are used to distinguish between transmission points.

17. The user equipment of claim 8, where the received transmission point specific signal occupies at least one of certain time and frequency resources, and distinguishes different TPs in at least one of time, frequency, and coding domain.

18. The user equipment of claim 8, wherein the processor and communications subsystem further cooperate to receive at least one of a configuration of the transmission point specific signal from the network and a transmit power of at least one reference transmission point from the network.

19. The user equipment of claim 8, wherein the processor and communications subsystem further cooperate to signal, as part of the signaling, at least one of a transmission point index and a bitmap of possible transmission points having numeral one for at least one of the reference transmission points.

20. The user equipment of claim 8, wherein the processor and communications subsystem further cooperate to, as part of the finding, send a list of transmission points to a network element and receive the reference transmission points from the network element.

21. The method of claim 1, wherein the uplink power control is calculated based on the average path loss of at least two of the reference transmission points.

22. The user equipment of claim 8, wherein the uplink power control is calculated based on the average path loss of at least two of the reference transmission points.

* * * * *

UNITED STATES PATENT AND TRADEMARK OFFICE
CERTIFICATE OF CORRECTION

| | |
|---|---|
| PATENT NO. | : 8,965,443 B2 |
| APPLICATION NO. | : 13/208723 |
| DATED | : February 24, 2015 |
| INVENTOR(S) | : Shiwei Gao et al. |

Page 1 of 1

It is certified that error appears in the above-identified patent and that said Letters Patent is hereby corrected as shown below:

On the Title Page

Item (75), Inventors replace "(JP)" with --(CA)--

Signed and Sealed this
Twenty-sixth Day of January, 2016

Michelle K. Lee
*Director of the United States Patent and Trademark Office*